(12) United States Patent
Maeda et al.

(10) Patent No.: US 6,785,487 B2
(45) Date of Patent: Aug. 31, 2004

(54) IMAGE FORMING DEVICE WITH FUNCTION SELECTING KEYS AND AT LEAST ONE SHORTCUT KEY

(75) Inventors: Tetsuya Maeda, Osaka (JP); Tetsuya Yoshioka, Osaka (JP); Yoshiyuki Fujiwara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 77 days.

(21) Appl. No.: 10/100,903

(22) Filed: Mar. 20, 2002

(65) Prior Publication Data

US 2002/0136563 A1 Sep. 26, 2002

(30) Foreign Application Priority Data

Mar. 21, 2001 (JP) ........................................ 2001-080092
Mar. 21, 2001 (JP) ........................................ 2001-081620

(51) Int. Cl.[7] .............................................. G03G 15/00
(52) U.S. Cl. ........................................ 399/81; 345/827
(58) Field of Search ...................... 399/81, 85; 345/827, 345/866, 172, 847

(56) References Cited

U.S. PATENT DOCUMENTS 5,543,897 A * 8/1996 Altrieth, III ................ 399/81
5,977,954 A * 11/1999 Arimoto et al. ............. 345/168
6,114,978 A * 9/2000 Hoag ........................... 341/23
6,567,627 B2 * 5/2003 Maeda et al. .................. 399/81

FOREIGN PATENT DOCUMENTS

| JP | 04-339454 | | 11/1992 | | |
| JP | 11338313 A | * | 12/1999 | .......... | G03G/21/00 |
| JP | 2000029602 A | * | 1/2000 | ............. | G06F/3/00 |

* cited by examiner

*Primary Examiner*—Robert Beatty
(74) *Attorney, Agent, or Firm*—Smith, Gambrell & Russell, LLP

(57) ABSTRACT

This image forming device is arranged such that desired functions and their respective setting details can be allocated to shortcut keys, and titles and icons representing the functions allocated to the shortcut keys can also be designated for the shortcut keys and displayed on the shortcut keys. Accordingly, when executing a function allocated to a shortcut key, the operator can select the desired function according to the indication on the shortcut key without having to refer to the operations manual or the like. Also, the operator can start the image forming operation for executing the function together with its setting details only by a pressing operation on the shortcut key, being spared operations for setting such details of the selected function. As a result, the number of times of key operations by the operator is reduced, thereby improving the operability.

5 Claims, 25 Drawing Sheets

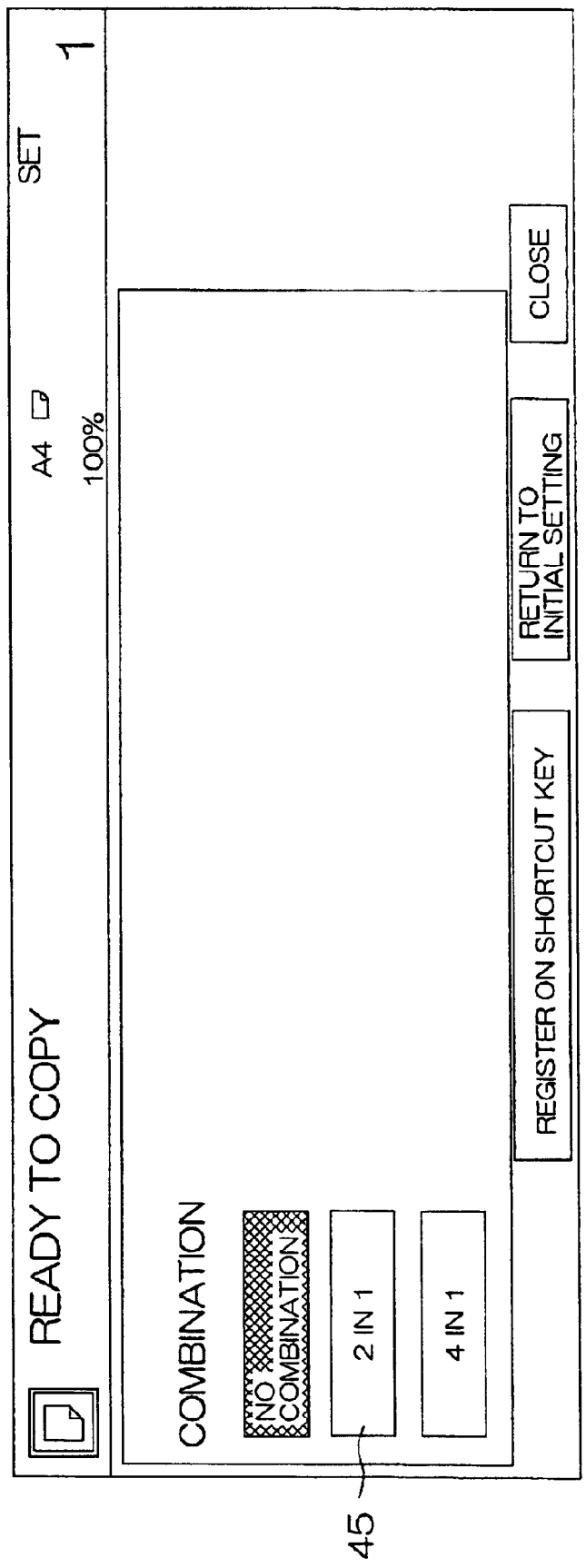

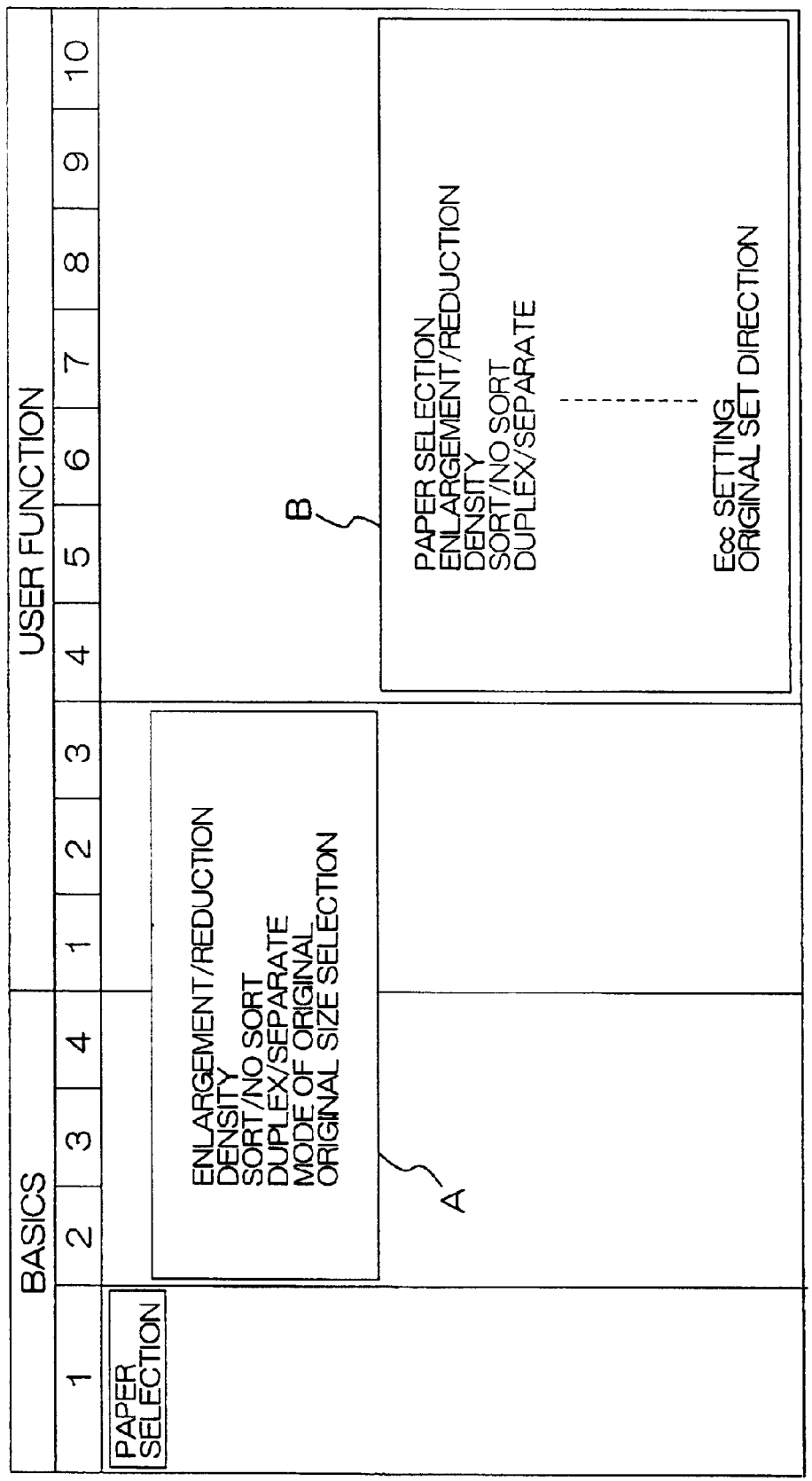

IMAGE FORMING DEVICE WITH FUNCTION SELECTING KEYS AND AT LEAST ONE SHORTCUT KEY

This application is based on applications Nos. 2001-080092 and 2001-081620 filed in Japan, the content of which is incorporated hereinto by reference.

BACKGROUND OF THE INVENTION

1. Field of the Invention

The present invention relates to an image forming device provided with the functions of a copier, a printer, or a facsimile, or an image forming device comprising a combination of these devices. In particular, this invention relates to an improvement of the operation section of such an image forming device.

The present invention also relates to job data management in image forming devices provided with the functions of a copier, a printer, and/or a facsimile, and to job data management in image reading devices that save image data by converting them into digital signals.

2. Description of the Related Art (A) As an image forming device having an improved operation section, the image forming device disclosed in Japanese Unexamined Patent Publication (Kokai) No. H4-339454 has been known. This image forming device includes in its operation section a plurality of functions classified into four items as "Basics", "Applications", "Specials", and "Marker editing." The functions are further classified in each of the four items into hierarchically organized strata and each stratum thereof is provided with a screen for performing a setting for the function. Additionally to the above function keys, the basic screen of this image forming device has "Optional keys" which allow the user to assign desired functions thereto.

The above known image forming device is arranged as follows. To take the case of an operator wishing to assign the function "Relay broadcast" to an "Optional key" as an example, the operator operates "Specials" key, "Mode designation" key, "Register" key, and "Initial panel setting" key by pressing them in this order so as to make the display screen display a page including a key indicating "FAX optional key."

Subsequently, the operator operates the "FAX optional key" in this image forming device so as to make the display screen display a list of functions that can be registered, and then the operator presses the "Relay broadcast" key, thereby assigning the function of relay broadcast to the above optional key. This arrangement thus allows the operator to operate the key indicating "Relay broadcast" displayed in the optional key display area of the basic screen so that the number of times of the series of operations which is usually required can be reduced in this image forming device.

However, in the above conventional example, although the function of "Relay broadcast" can be assigned to the optional key, when specific details of the "Relay broadcast" function such as the relay station ID and broadcast addresses need to be designated, the operator needs to make the display screen display a prescribed screen by operating the "Relay broadcast" optional key and carry out entering operation on the screen each time such a need arises. Accordingly, even if the specific details of the "Relay broadcast" function are almost set ones, the operator has to carry out the detail designating operation as above every time. Such designating operations sometimes bother the operator. For this reason, presentation of a technique which may further enhance the operability of the operation section has been waited for.

With the background described above, the present invention has been devised in order to meet the demand described above, and it is an object of this invention to provide an image forming device with improved operability.

(B) Image forming devices which are provided with the functions of a copier, a printer, and/or a facsimile (they are often called "multifunction peripherals"), and image reading devices which save image data in the form of digital signals are used in offices and other places being connected via networks to a number of personal computers.

Image forming devices and image reading devices store great amount of job data in the built-in storing devices such as hard discs and then sequentially read out the job data that have been stored in the hard discs so as to carry out the job processings. The "job" mentioned here refers to a series of operations made by an image forming device such as a copier, a printer or a facsimile.

Since great quantity of data are inputted into and outputted from such image forming devices and image reading devices, they need to allow the user to efficiently manage the job processings thereof and easily recognize the states of the job processings.

Accordingly, it is another object of this invention to provide a job management device that allows the users of image forming devices and image reading devices to efficiently manage the job processings thereof and easily recognize the states of the job processings.

BRIEF SUMMARY OF THE INVENTION (A) An image forming device according to the present invention is arranged such that desired functions or desired functions and their detailed settings can be assigned to shortcut keys, and identification information such as titles and icons that correspond to the functions assigned to the shortcut keys can be designated for the shortcut keys and displayed.

According to the present invention, when an operator wishes to execute a function assigned to a shortcut key, the operator can select the desired function according to the indication of the shortcut key without referring to the operations manual or the like. The operator also can be spared the operations for setting details of the selected function and can start the image forming operation based on the selected function or the selected function and its detailed settings by only pressing the shortcut key. As a result, the image forming device according to the present invention reduces the number of times of key operations performed by the operator, thereby improving the operability.

The identification information (titles and icons) mentioned above may be selected from a prepared group of regular titles or arbitrarily inputted from a character entry screen, or selected from a preliminarily provided icon group. Additionally, it is possible to select a regular title and a regular icon at the same time, or an arbitral title and a regular icon at the same time for each of the shortcut keys.

(B) A job management device according to the present invention is used for image forming devices. The job management device used for image forming devices according to this invention comprises: job number assigning means for assigning job numbers to job data obtained by utilizing the functions of a copier, a printer, and/or a facsimile; storing means for storing the job data having the job numbers assigned by the job number assigning means by associating the job data with the respective job numbers; job execution means for executing jobs in the order of the job numbers in response to signals from a job execution key, while associating the processing conditions of the jobs with the job data in the storing means; and display means for displaying a list of the job numbers aligned in the order of the job numbers in response to signals from a job management key.

In this arrangement, job numbers are given to job data obtained by utilizing the functions of a copier, a printer, and/or a facsimile, and a job number list aligned in the order of the job numbers is displayed on the job management screen. Therefore, the user can precisely recognize the processing conditions of specific jobs even when great amount of job data have been inputted in the multifunction digital device.

Also, a job management device according to this invention may further comprise job processing modifying means for modifying the order of job processing and executing the jobs in the modified job processing order.

As mentioned above, if the job management device further includes job processing modifying means for modifying the order of job processing so as to execute the jobs in the modified job processing order, it is possible to efficiently manage the job processings.

Also, a job management device according to this invention is used for image reading devices arranged for reading images by converting them into digital signals and storing the image data that have been read as job data. The job management device used for image reading devices comprises: job number assigning means for assigning job numbers to the job data; storing means for storing the job data having the job numbers assigned by the job number assigning means by associating the job data with the respective job numbers; job execution means for executing jobs in the order of the job numbers in response to signals from a job execution key while associating the processing conditions of the jobs with the job data in the storing means; and display means for displaying a list of the job numbers aligned in the order of the job numbers in response to signals from a job management key.

Structural details of this invention are hereinafter described referring to the accompanying drawings.

BRIEF DESCRIPTION OF THE DRAWINGS

FIGS. 6A and 6B illustrate examples of the screen for setting specific details of the "Combination" function.

FIG. 7 illustrates in what order of priority the functions in the function list are displayed on the basic screen and the user function screen.

DETAILED DESCRIPTION OF THE INVENTION

1. First Embodiment

An embodiment of the image forming device according to the present invention is now explained taking a copier as an example.

<The Operation Section of a Copier>

Figure 1:
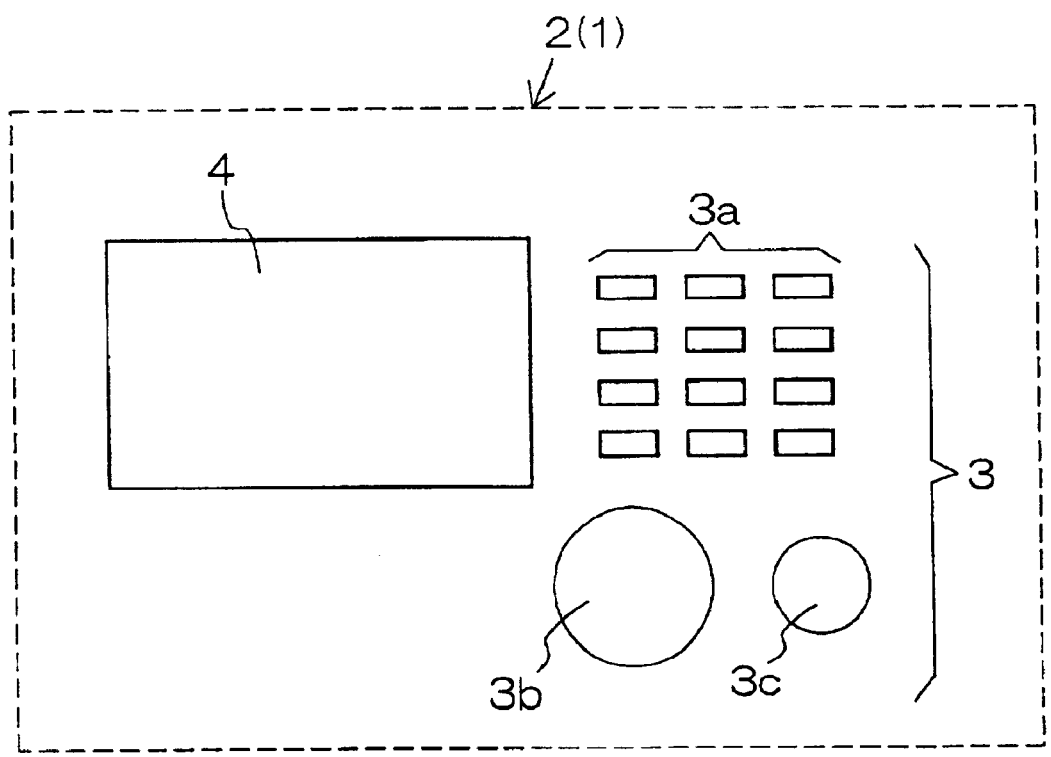
FIG. 1 is a schematic view showing the operation section of an image forming device.

FIG. 1 illustrates the operation section 2 of a copier 1 as an embodiment of the present invention. The operation section 2 comprises a key operation part 3 comprising various keys such as a numeric keyboard 3a, a start key 3b, a stop key 3c and the like, and a LCD part 4 located adjacent to the key operation part 3. The LCD part 4 comprises a touch panel disposed on the display surface of a liquid crystal display. The operator can make the copier 1 execute copying with conditions desired by the operator by operating keys displayed on the LCD part 4 or the key operation part 3.

Figure 2:
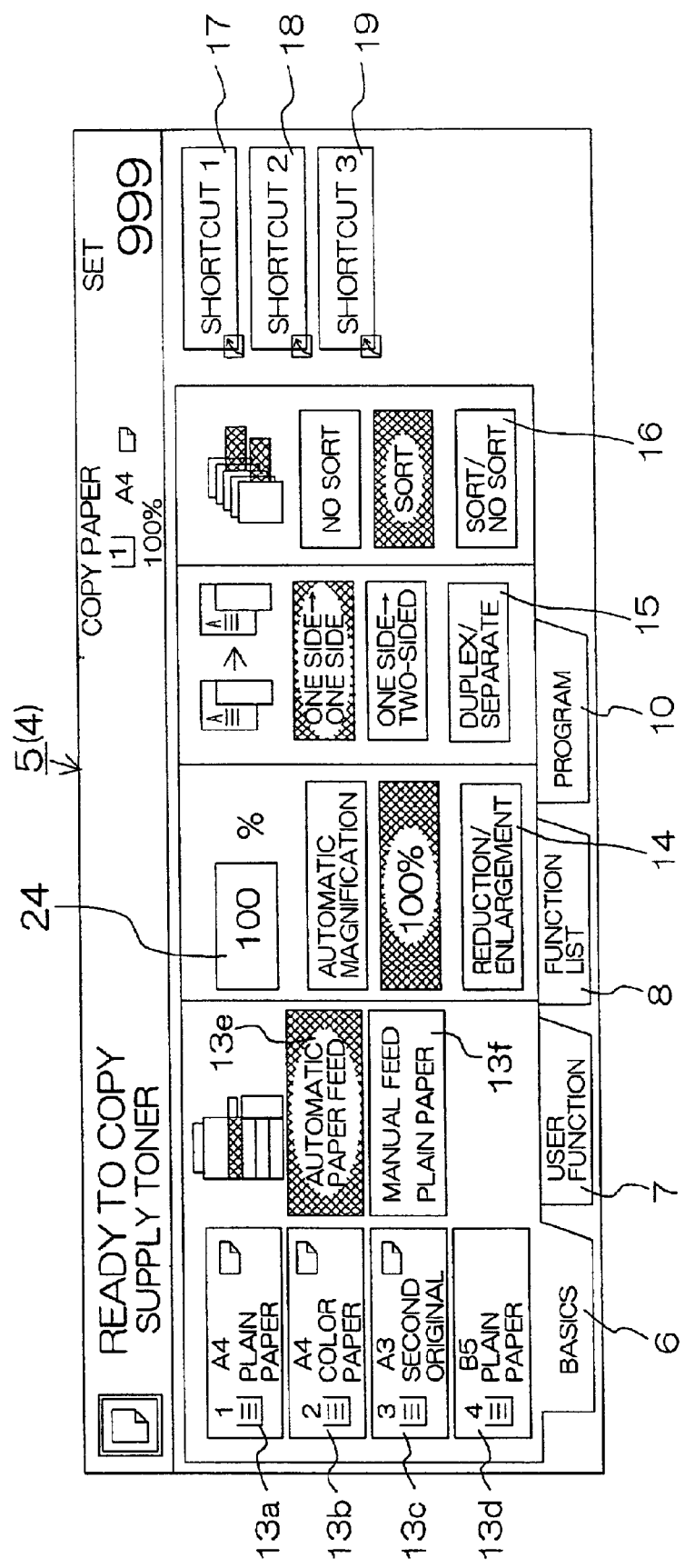
FIG. 2 illustrates a basic screen displayed on the operation section.

FIG. 2 shows a basic screen 5 displayed on the LCD part 4. The basic screen 5 is displayed immediately after the power of the copier 1 is turned on. In the area below the basic screen 5, there are displayed, in addition to the "Basics" tab 6 for displaying the basic screen 5, a "User function" tab 7, a "Function list" tab 8, and a "Program" tab 10. Pressing the "User function" tab 7 brings the user function screen 11 shown in FIG. 3 on the display and pressing the "Function list" tab 8 brings the function list screens 12 shown in FIGS. 4 and 5 on the display. In addition, when the "Program" tab 10 is pressed, a program setting screen (not shown) for registering a series of functions for driving the copier 1 by combining them together is to be displayed.

On the basic screen 5 in FIG. 2, function selecting keys 13a–13f, 14, 15, and 16 for designating the modes of four functions, which are "Paper selection", "Reduction/Enlargement", "Duplex/Separate", and "Sort/No sort", respectively, are displayed. The function selecting keys 13a–13f provided for the "Paper selection" function consists of six keys from 13a for "A4 plain paper" to 13f for "manual feed plain paper."

On the rightmost area of the basic screen 5, three shortcut keys 17, 18, and 19 are displayed. These three shortcut keys allow the user to designate and register three functions.

Meanwhile, the basic screen 5 in FIG. 2 shows its state when "Automatic paper feed" is designated for the "Paper selection" function, "100%" is designated for the "Reduction/Enlargement" function, "One side→One side" is selected for the "Duplex/Separate" function, and "No sort" is selected for the "Sort/No sort" function. (See the hatched keys.)

When the operator presses the keys 14, 15, and 16 for "Reduction/Enlargement", "Duplex/Separate", and "Sort/No sort", respectively, screens for setting the specific details of the respective functions are to be displayed.

Figure 5A:
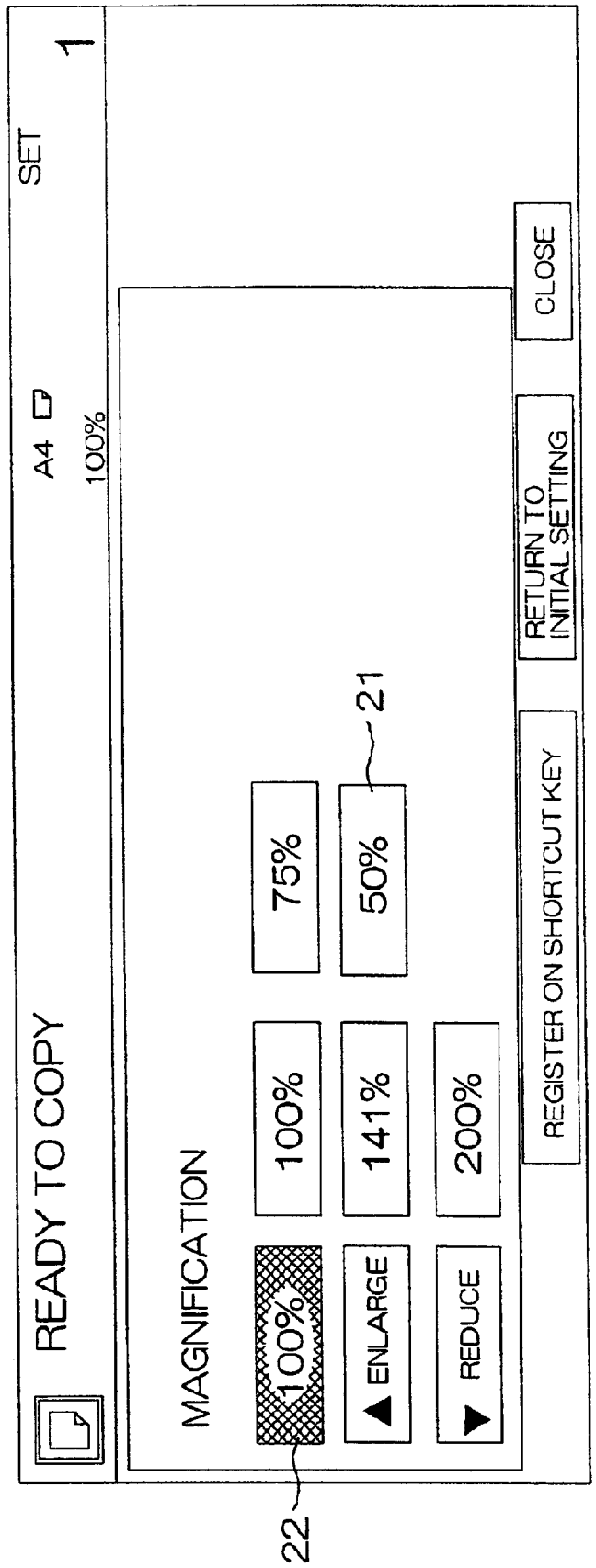
FIGS. 5A–5C illustrate examples of the screen for detailed setting of the "Reduction/Enlargement" function.
Figure 5B:
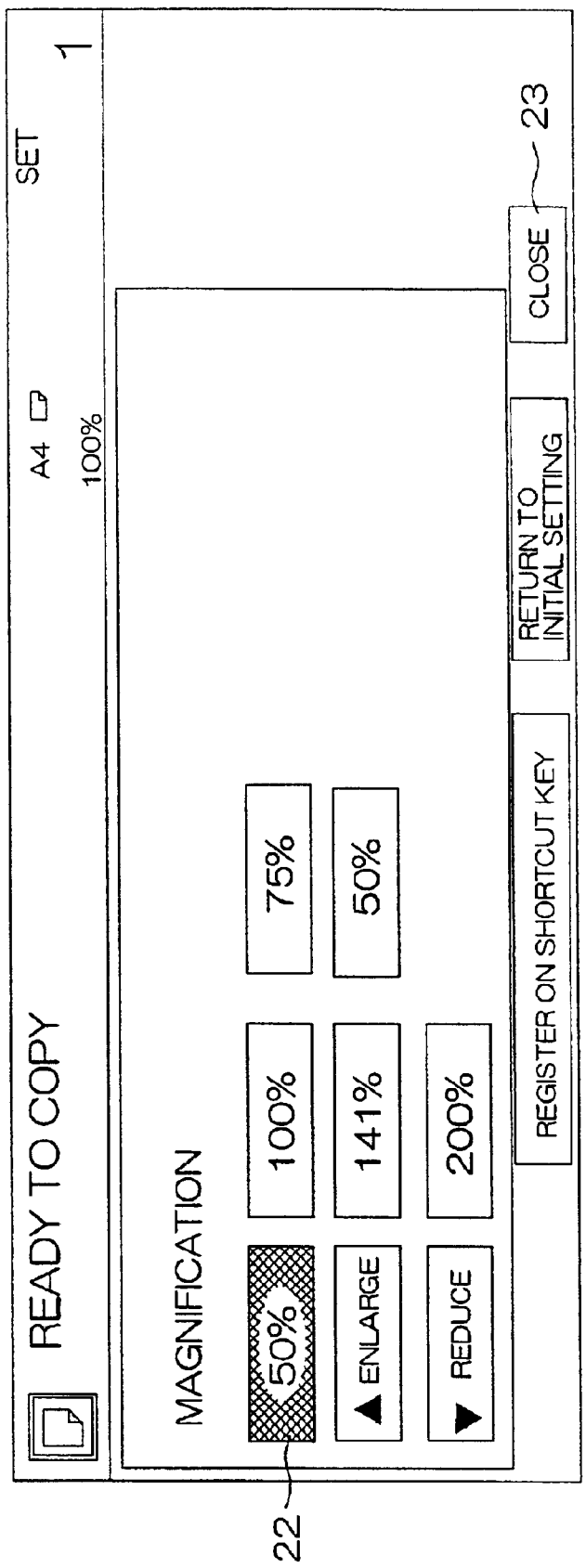

For example, the function selecting key 14 for "Reduction/Enlargement" is pressed, a screen for its detailed setting shown in FIG. 5A is displayed. When the key 21 indicating "50%" is pressed on this screen, the indication of the magnification display 22 turns from 100% to 50% as shown in FIG. 5B. When the key 23 indicating "Close" is pressed, the display returns to the basic screen 5 in FIG. 5C, where the selected magnification indicator 24 displays 50% and the setting of the copying magnification is completed. With the display being in this condition, when the start key 3b in FIG. 1 is pressed, copying is started according to the conditions that have been set by the function selecting keys.

Figure 3:
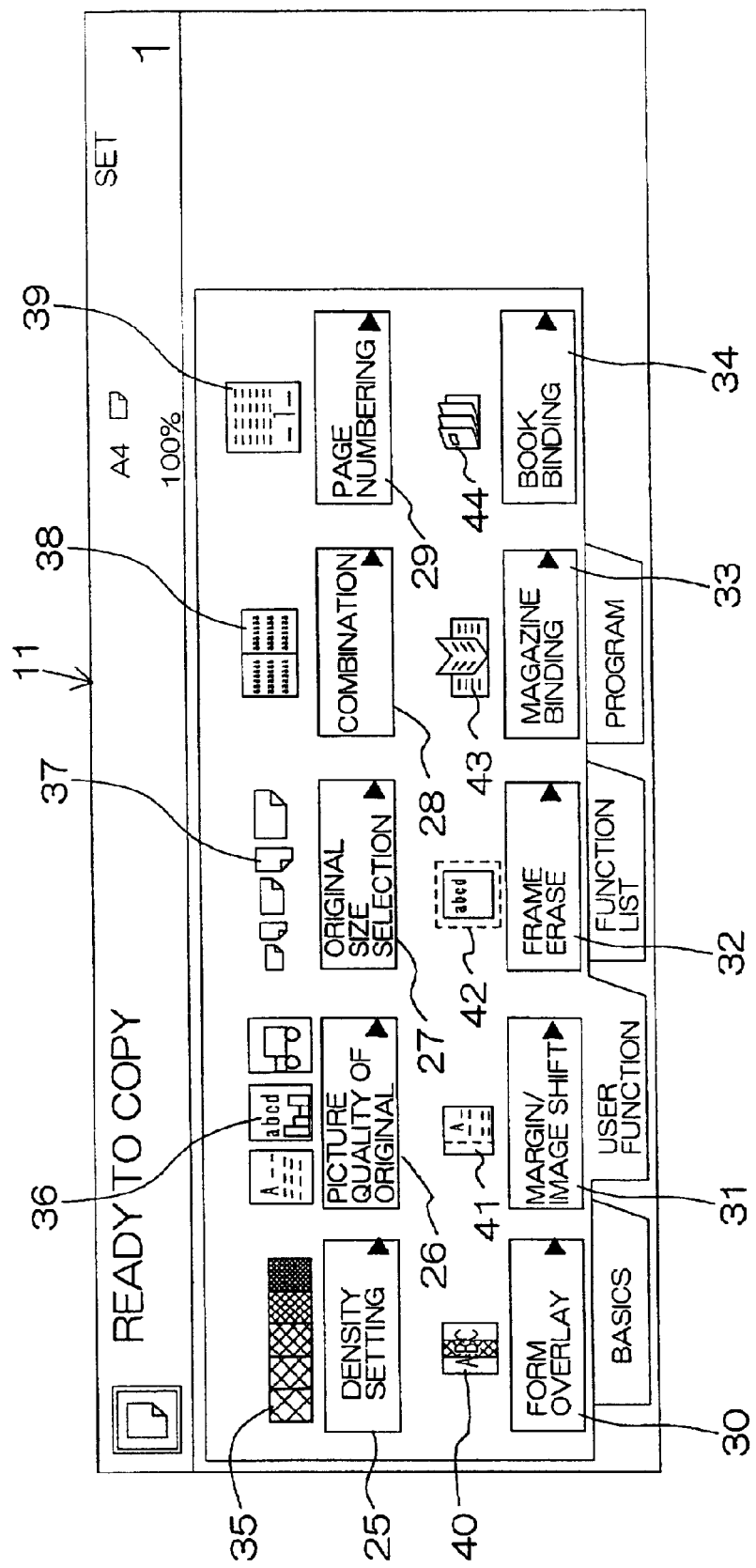
FIG. 3 illustrates a user function screen displayed on the operation section.

FIG. 3 illustrates the user function screen 11 displayed on the LCD part 4. On the user function screen 11, there are displayed ten functions indicated as "Density setting", "Picture quality of original", "Original size", "Combination", "Page numbering", "Form overlay", "Margin/Image shift", "Frame erase", "Magazine binding", and "Book binding" together with the respective function selecting keys 25–34, and icons 35–44 representing the respective functions. When any of these function selecting keys 25–34 is pressed, the screen for detailed setting of the selected function is displayed.

Figure 6B:
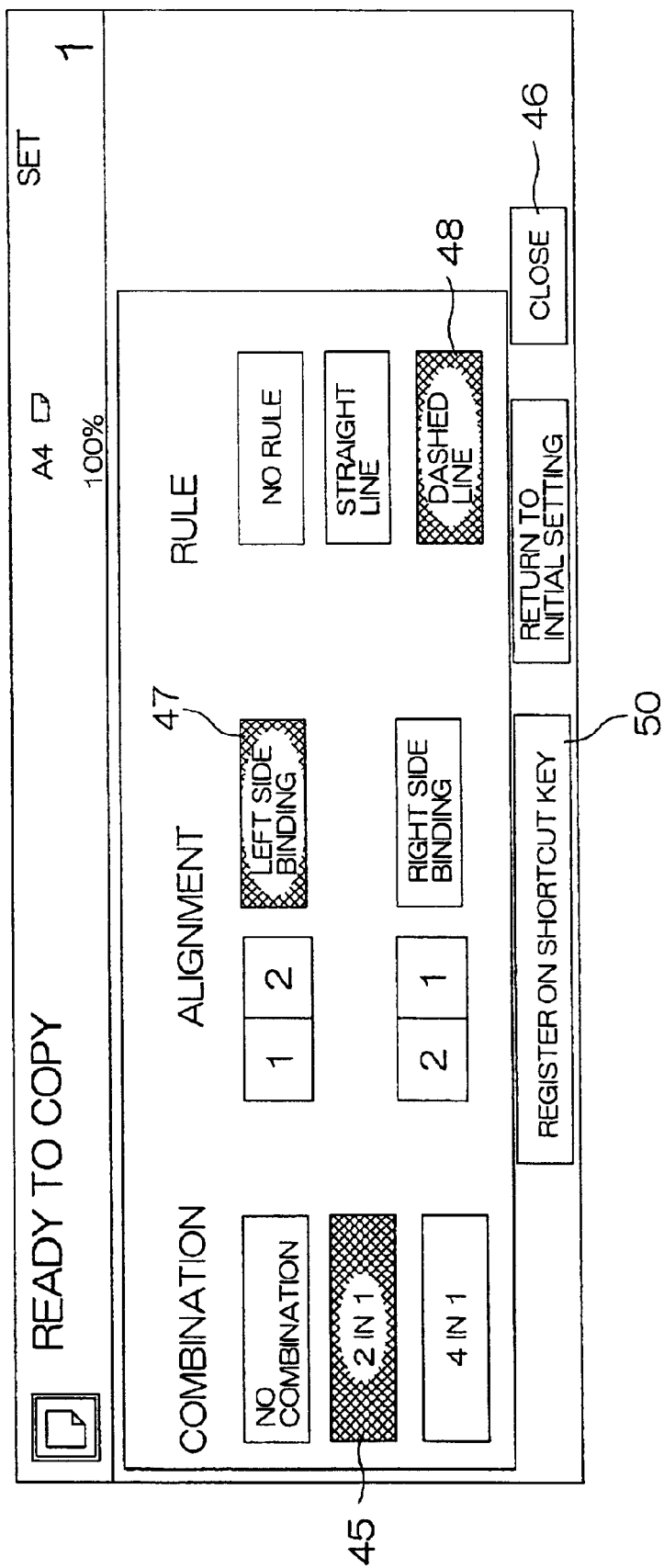

For instance, when the function selecting key 28 for "Combination" is pressed, the detail setting screen shown in FIG. 6A is displayed. Here, if the operator presses the key 45 indicating "2 in 1", another detail setting screen shown in FIG. 6B is displayed. When the operator selects "Left side binding" for Alignment, and "No rule" for Rule, and then presses the "Close" key 46, the user function screen 11 in FIG. 3 appears again, when the detailed setting of the Combination is completed. With the display being in this condition, when the operator presses the start key 3b, copying is carried out according to the conditions selected by the function selecting keys.

Figure 4A:
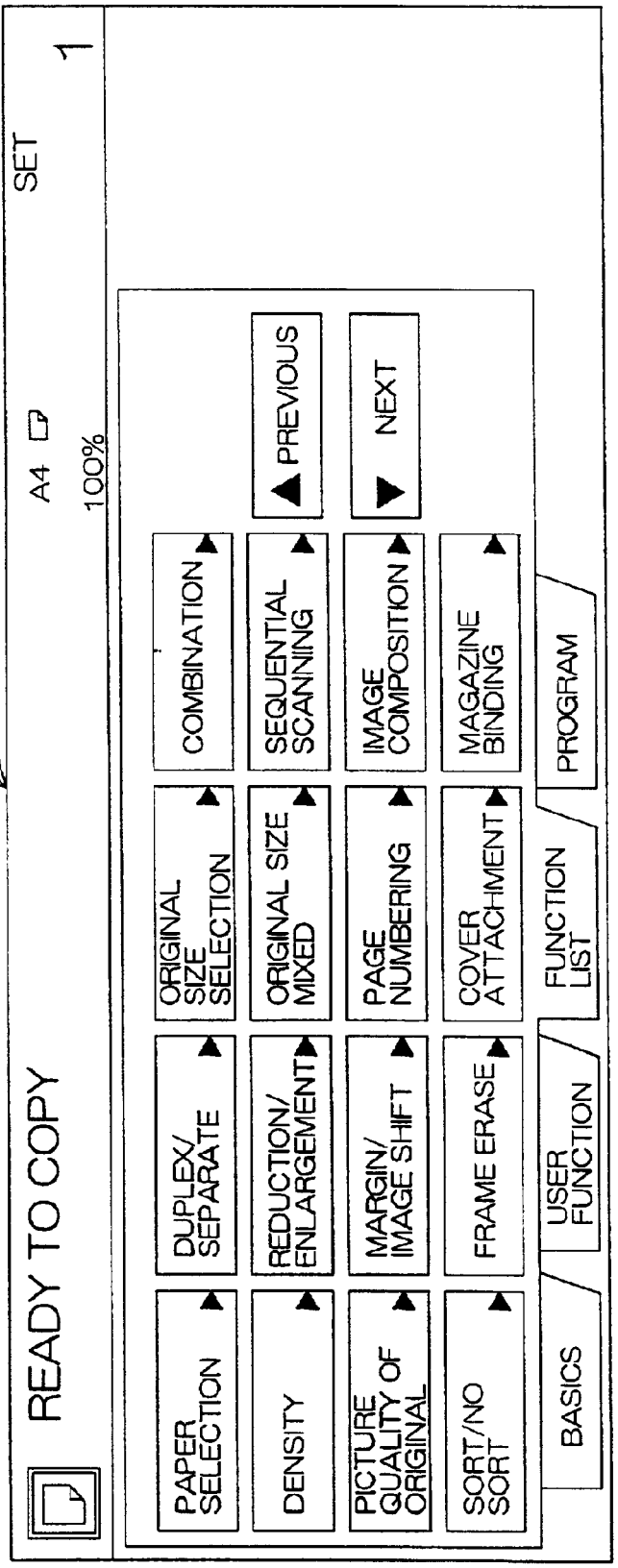
FIGS. 4A and 4B illustrate function list screens displayed on the operation section.
Figure 4B:
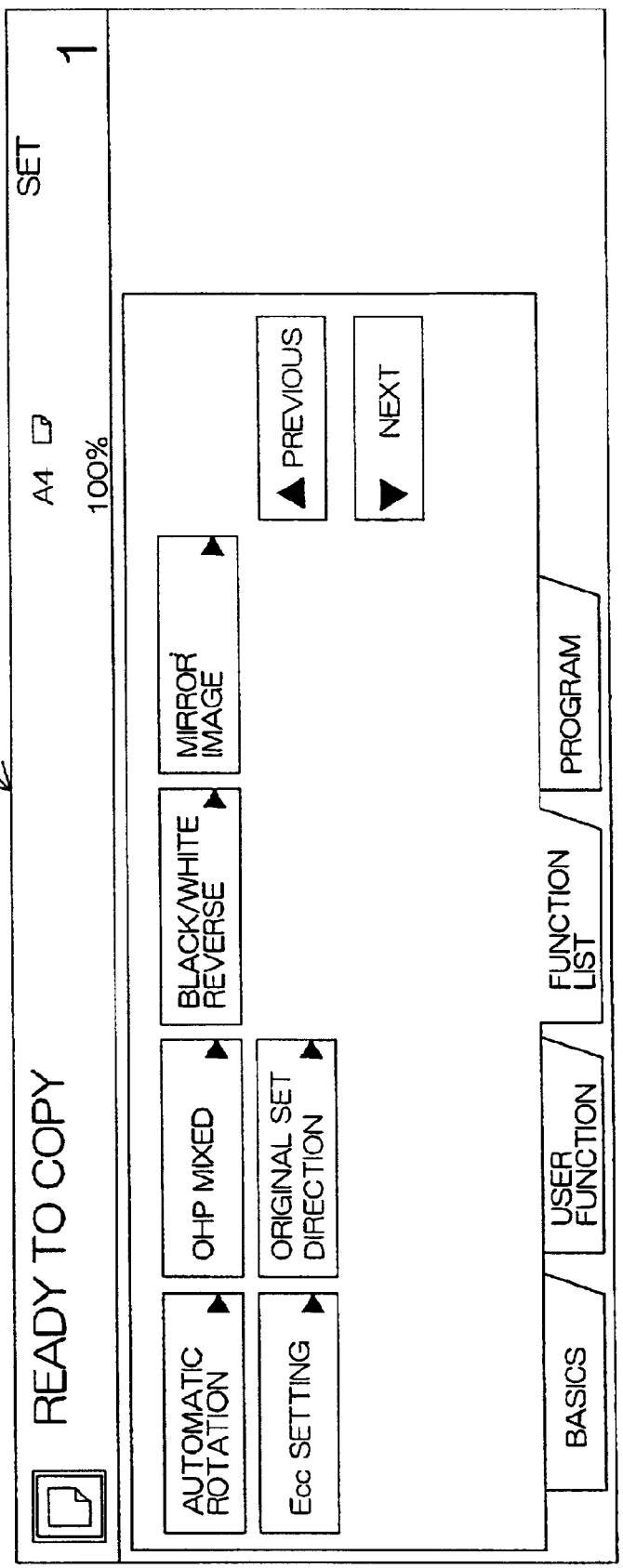
Figure 5C:
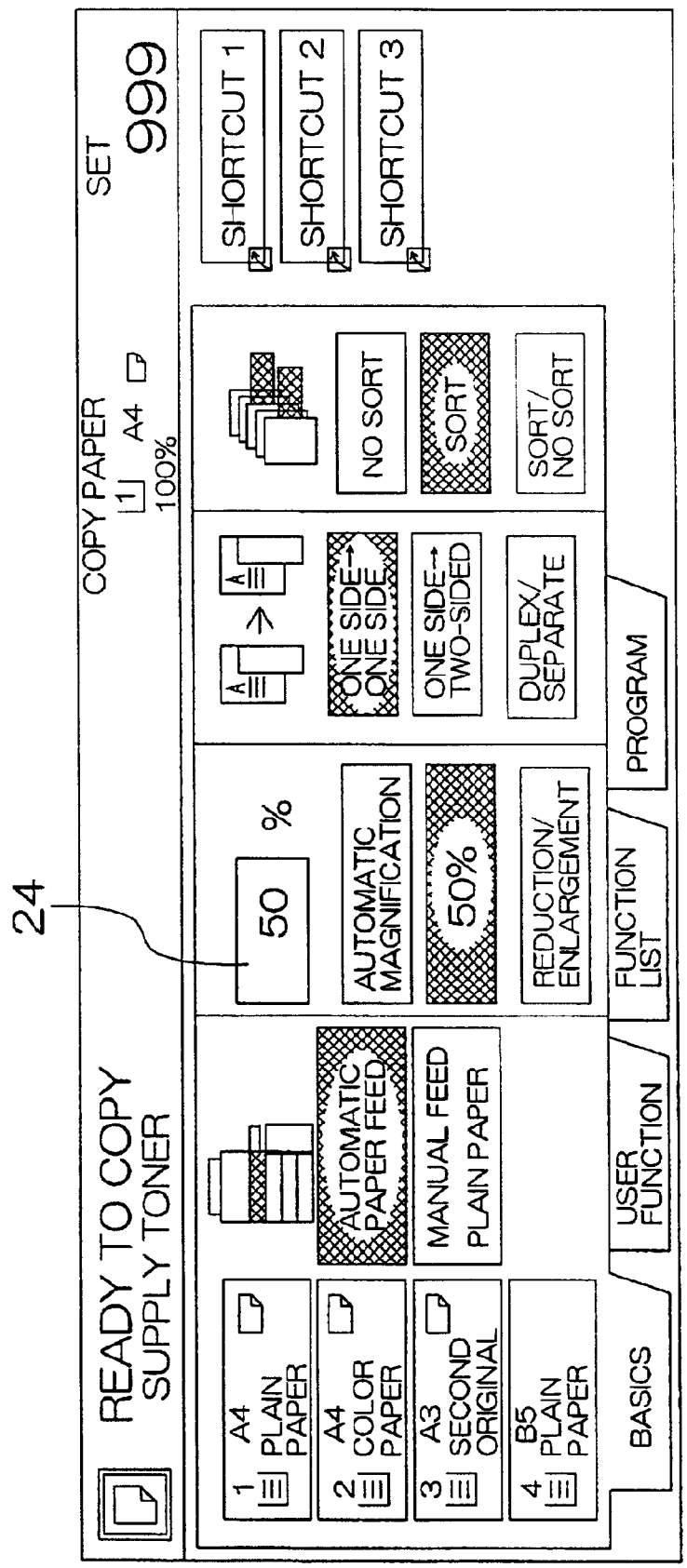

FIGS. 4A and 4B show function list screens 12A and 12B, respectively, displayed on the LCD part 4.

On the function list screens 12A and 12B, there are displayed function selecting keys corresponding to the entire 22 functions of the copier 1, from "Paper selection" to "Original set direction". These function selecting keys are displayed being separated into two groups on the screens (12A and 12B) because of the limited area of the LCD part 4. When any of these function selecting keys is pressed, the screen for detailed setting of the selected function is displayed.

Meanwhile, on the basic screen 5 in FIG. 2, four specific functions are displayed, and on the above user function screen 11 in FIG. 3, ten specific functions are displayed. The functions to be displayed on these screens can be predetermined on an initial setting screen (not shown).

To explain more specifically, as shown in FIG. 7, "Paper selection" is supposed to be the most frequently used function in the entire twenty-two functions and six functions that are supposed to be the second most frequently used functions after "Paper selection" are included in A group. Other fifteen functions that are less frequently used are included in B group. Setting on the initial setting screen (not shown) allows the basic screen 5 in FIG. 2 to display the "Paper selection" function together with other three functions arbitrarily selected from the six functions included in group A in FIG. 7. In addition, setting on the initial setting screen (not shown) also allows the user function screen 11 in FIG. 3 to display three functions included in group A that are not displayed on the basic screen 5, and additional seven functions arbitrarily selected from group B in FIG. 7. As described so far, this embodiment is arranged such that the most frequently used "Paper selection" function is fixedly displayed on the basic screen 5, and six functions that are supposed to be the second most frequently used functions after the "Paper selection" function are allocated to the basic screen 5 and the user function screen 11 with precedence, thereby improving the user-friendliness.

Now, the functions of the shortcut keys are described.

It is possible to allocate desired functions selected from the 22 functions that the copier 1 has or such desired functions together with their respective setting details to the three shortcut keys 17, 18 and 19 shown in FIG. 2. By this allocation, it is possible to decrease the number of times of key operations required for the selection of desired functions, allowing for speedy copying.

Figure 8:
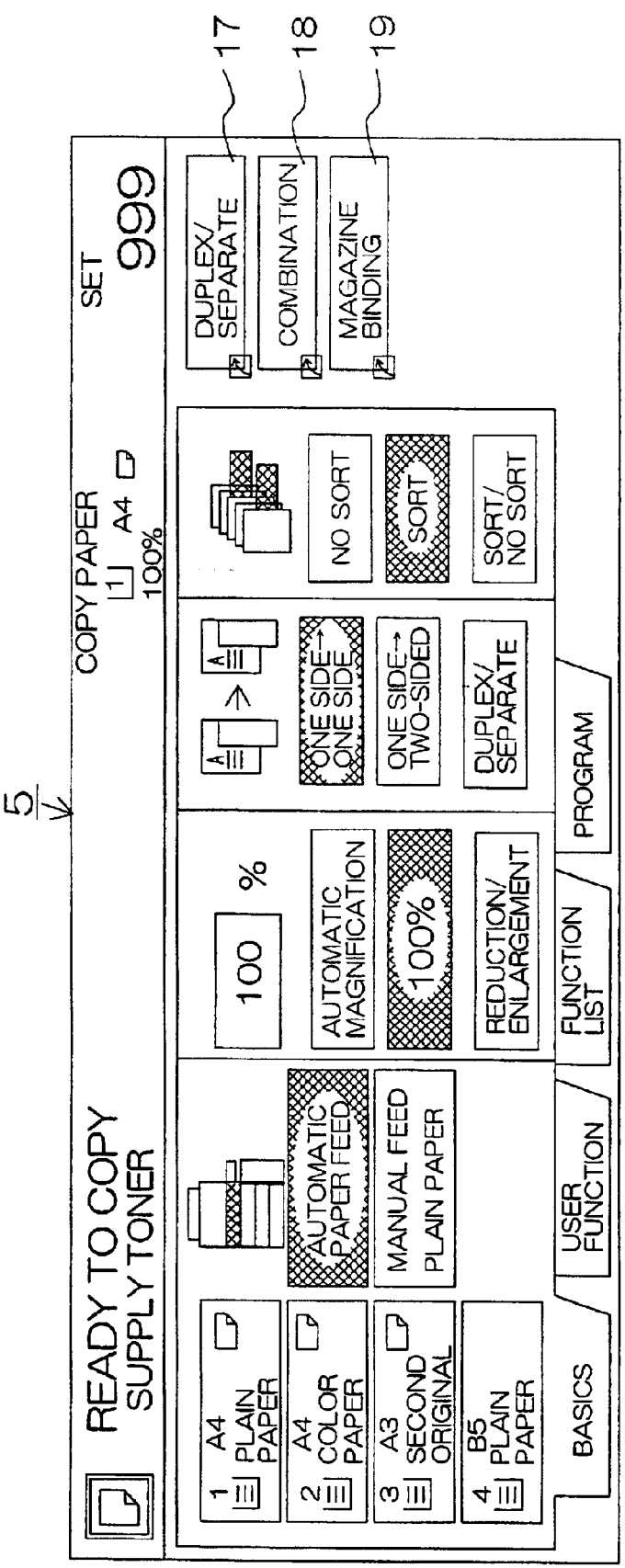
FIG. 8 shows an example of the basic screen with shortcut keys having titles selected from the title list and inputted therein.

An example case where the "Duplex/Separate" function, the "Combination" function, and the "Magazine binding/Book binding" function are allocated to the shortcut keys 17, 18, and 19, respectively, is shown in FIG. 8.

The operations for allocating a function to the shortcut key 18 is now described supposing the function is "Combination".

Figure 9:
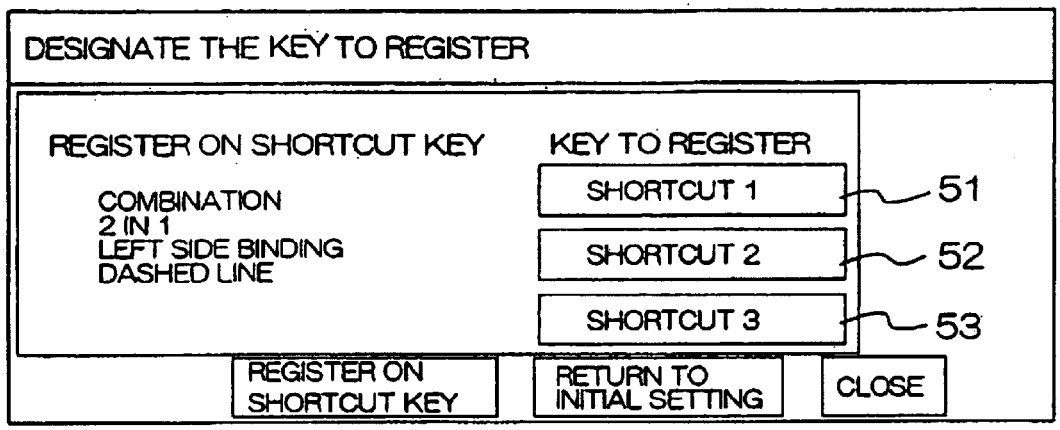
FIG. 9 shows a screen for designating a shortcut key for a registration.

When the "Combination" key is pressed on the user function screen 11 in FIG. 3, or on the function list screen 12A or 12B in FIG. 4, the screen switches to the detail setting screen shown in FIG. 6A. The detail setting screen in FIG. 6A displays keys indicating "No combination", "2 in 1", and "4 in 1". On this detail setting screen in FIG. 6A, when the "No combination" key is pressed, the screen switches to the screen for key designation for registration shown in FIG. 9. On this screen for key designation for registration in FIG. 9, there are displayed a key 51 for "Shortcut 1", a key 52 for "Shortcut 2", and a key 53 for "Shortcut 3". The operator then selects one of these shortcut keys 51–53. Here, it is assumed that the "Duplex/Separate" function has been already allocated to the "shortcut 1" key 51 and characters indicating the "Duplex/Separate" function have been displayed thereon. The operator then presses the "Shortcut 2" key 52 to select it. That brings the title entry screen shown in FIG. 10. The title entry screen in FIG. 10 has five entry keys 54–58 displayed thereon, the keys indicating "Select title from the title list", "Select icon from the icon list", "Enter free title from the keyboard", "Select icon from the icon list and title from the title list", and "Select icon and enter free title from the keyboard", respectively. When the operator presses the "Select title from the title list" key 54, the title selection screen shown in FIG. 11 is displayed. When the operator selects the title "Combination", which is appropriate for the function to be allocated to the "shortcut 2" key 18, from the title list on the title selection screen, and then presses the "Close" key 60, the Combination function has been allocated to the "Shortcut 2" key 18.

Now, the procedure for allocating other functions in the lower strata to the shortcut keys is explained. When the operator presses the "2 in 1" key 45 on the detail setting screen in FIG. 6A, the screen switches to the detail setting screen of the next lower stratum in FIG. 6B. On this detail setting screen of the next lower stratum, when, for instance, the "Left side binding" key 47 in Alignment, the "Dashed line" key 48 in Rule, and the "Register on shortcut key" key 50 are successively pressed, the screen switches to the screen for key designation for registration in FIG. 9. On this screen for key designation for registration, there are displayed the "Shortcut 1" key 51, the "Shortcut 2" key 52, and the "Shortcut 3" key 53. Here, the operator selects the "Shortcut 2" key 52.

Figure 10:
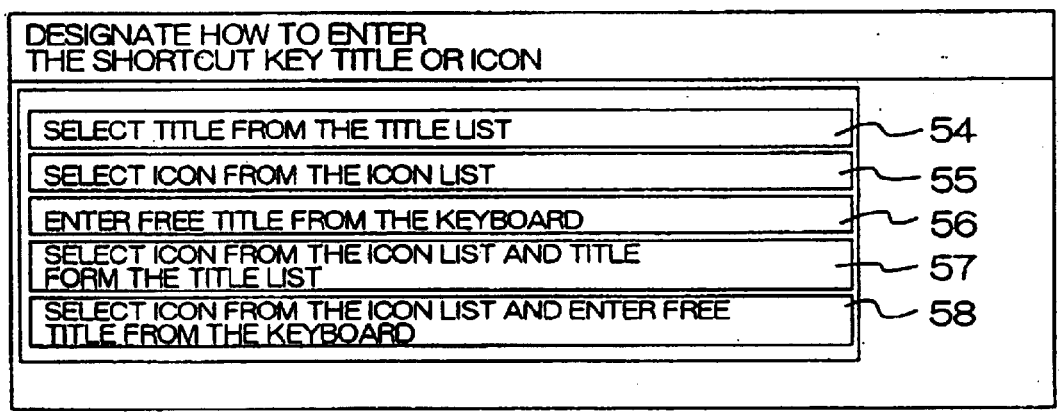
FIG. 10 shows the screen for entering the title of a shortcut key.
Figure 11:
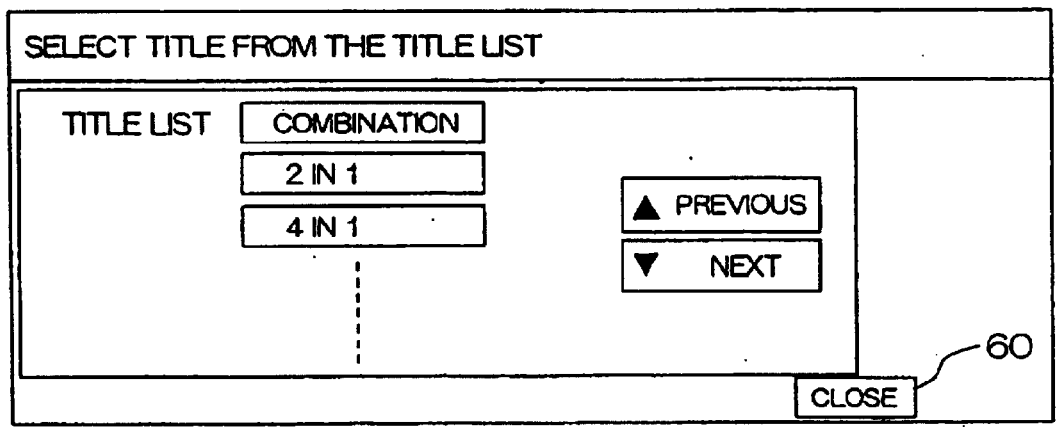
FIG. 11 shows a screen for selecting the title of a shortcut key.

The screen then switches to the title entry screen shown in FIG. 10. The title entry screen in FIG. 10 has five entry keys 54–58 displayed thereon, the keys indicating "Select title from the title list", "Select icon from the icon list", "Select icon and enter free title from the keyboard", "Select icon from the icon list and title from the title list", and "Select icon and enter free title from the keyboard", respectively.

Figure 12:
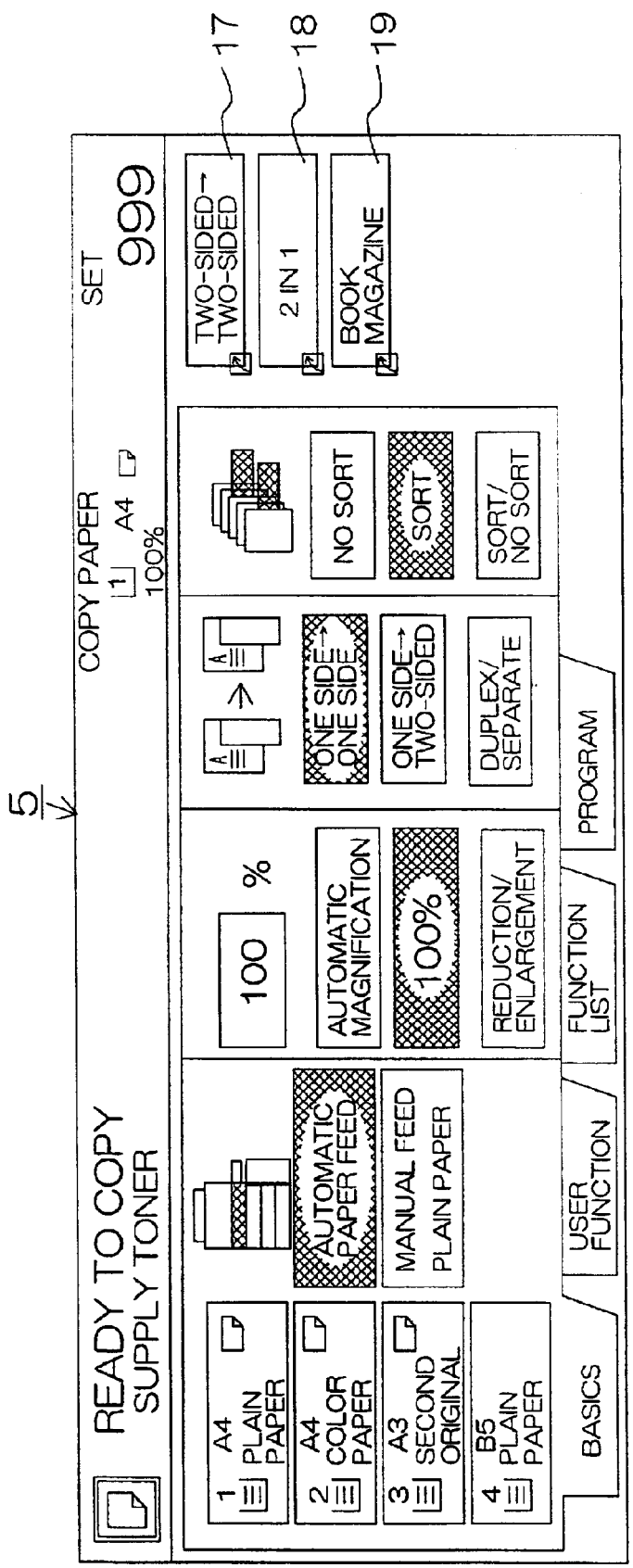
FIG. 12 shows another example of the basic screen with shortcut keys having titles selected from the title list and inputted therein.

When the operator presses the "Select title from the title list" key 54, the title selection screen shown in FIG. 11 is displayed. When the operator selects the title "2 in 1", which is appropriate for the function to be allocated to the "shortcut 2" key 18, from the title list on the title selection screen and then presses the "Close" key 60, the Combination function whose setting contents are "2 in 1", "Left side binding", and "Dashed line", has been allocated to the "Shortcut 2" key 18. At the same time, the selected title "2 in 1" is displayed on the "Shortcut 2", key 18 as shown in FIG. 12.

Figure 13:
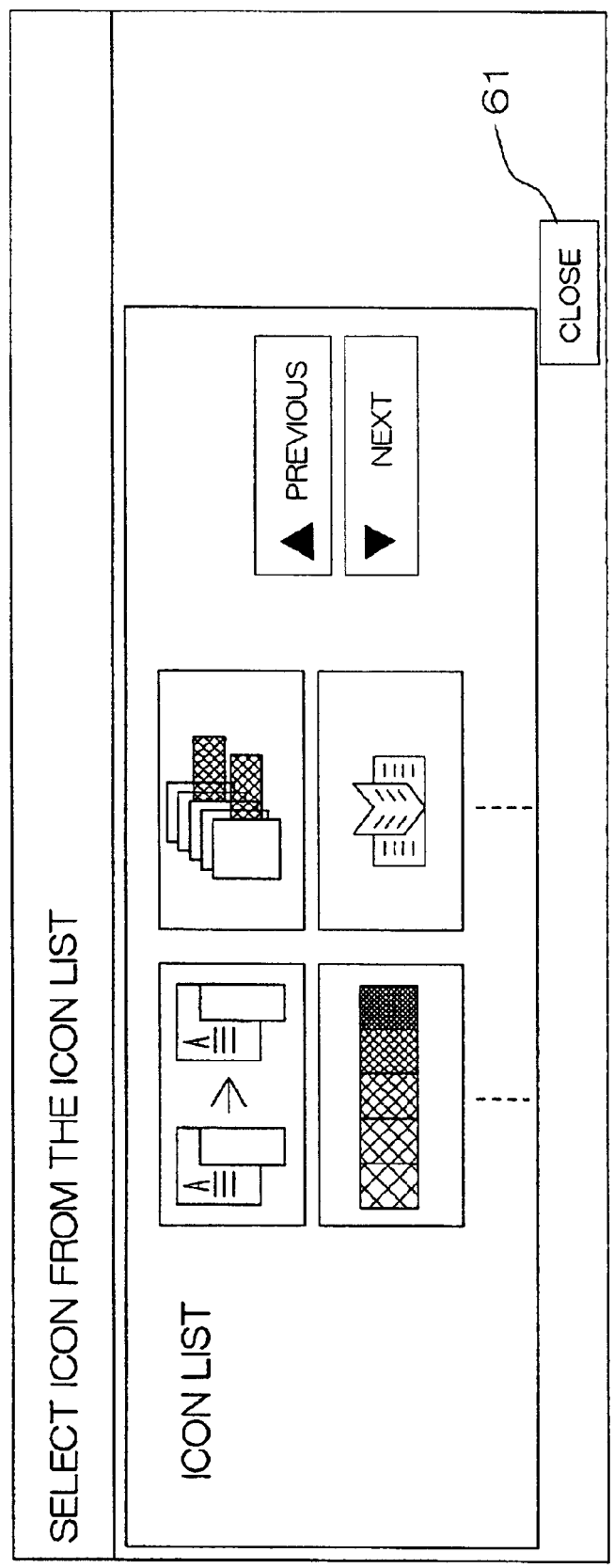
FIG. 13 shows a screen for selecting an icon for a shortcut key.
Figure 14:
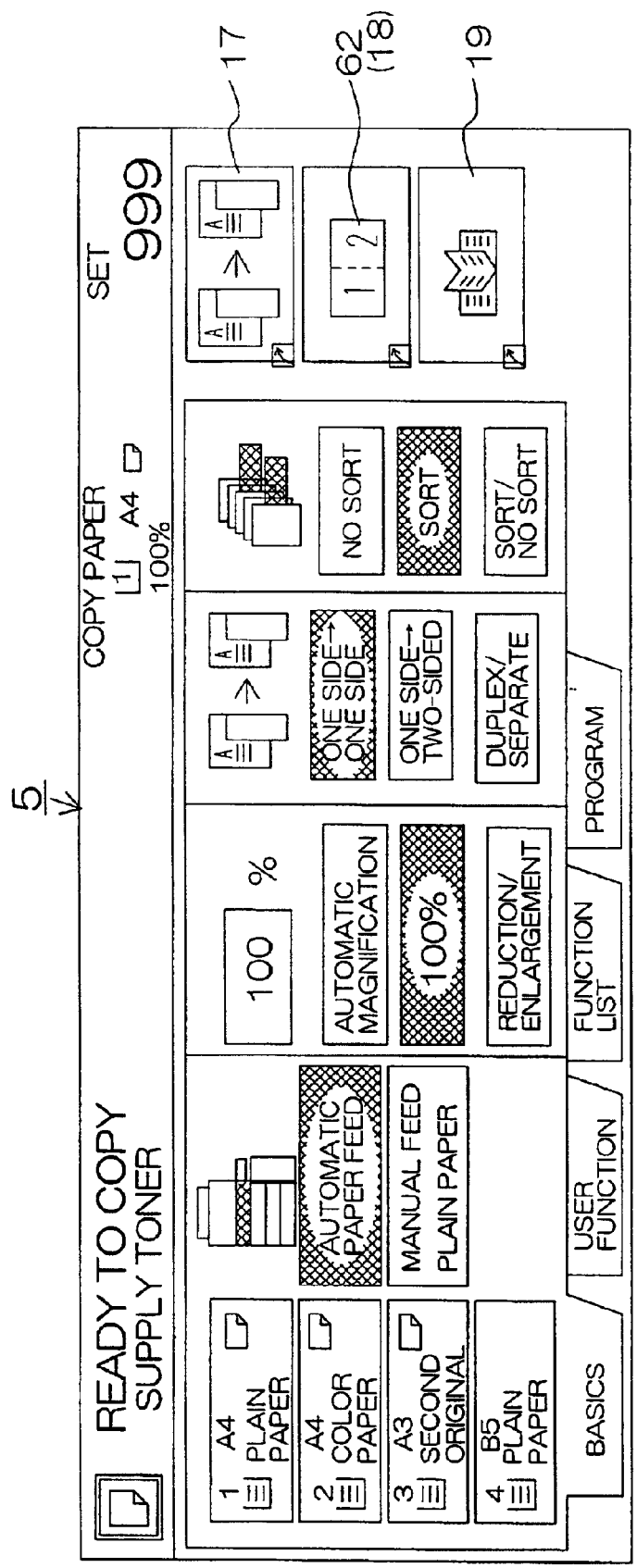
FIG. 14 illustrates the basic screen with shortcut keys having icons selected from the icon list and inputted therein.

On the other hand, when the operator presses the "Select icon from the icon list" key 55 on the screen in FIG. 10, the icon selection screen shown in FIG. 13 is displayed. When the operator selects the appropriate icon corresponding to the function allocated to the shortcut key from the list of icons on the icon selection screen and then presses the "Close" key 61, the Combination function whose contents are "2 in 1", "Left side binding", and "Dashed line" has been allocated to the "Shortcut 2" key 18. At the same time, the selected icon 62 is displayed on the "Shortcut 2" key as shown in FIG. 14.

Figure 15:
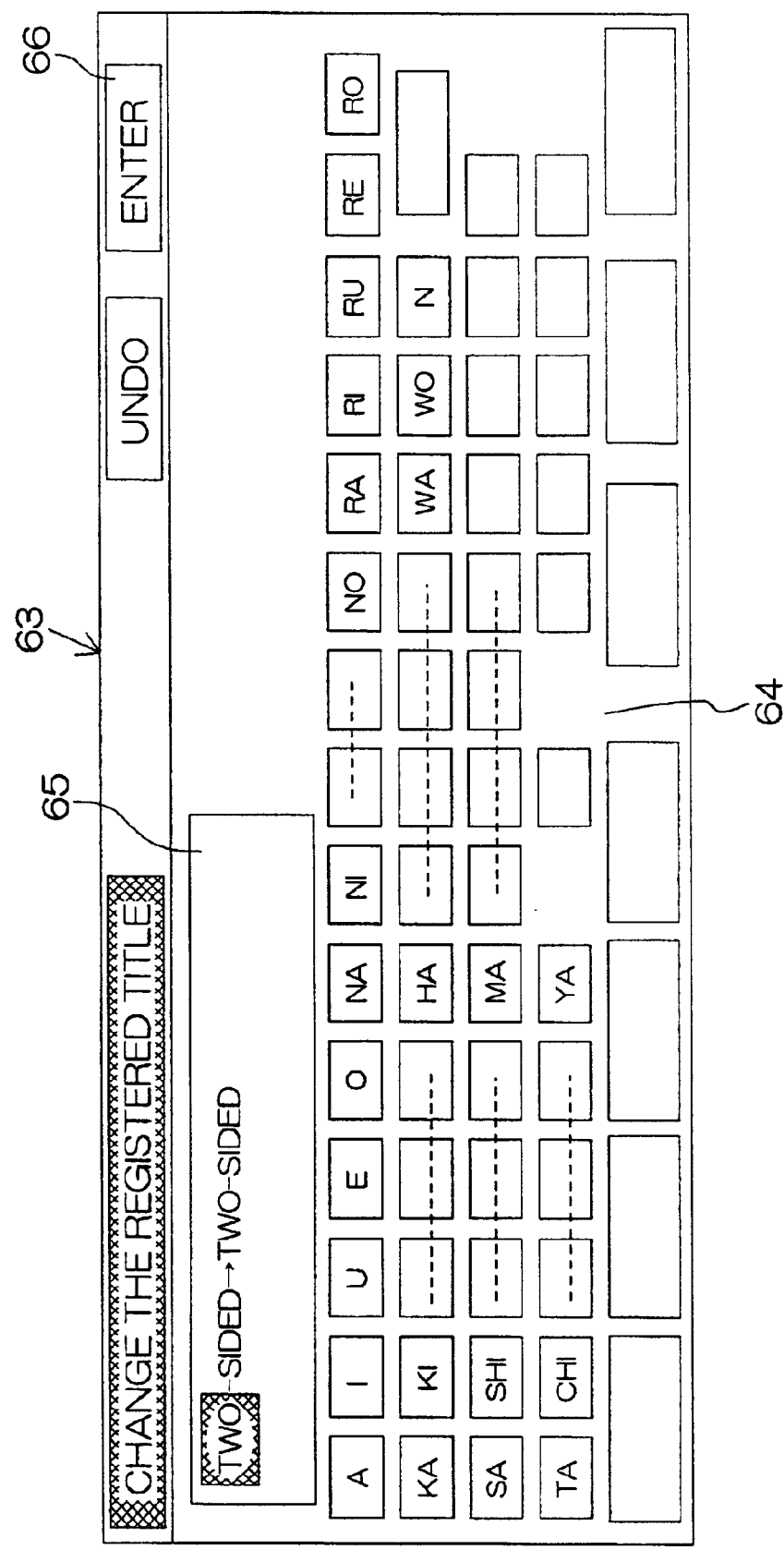
FIG. 15 illustrates a screen for character entry of the title of a shortcut key.
Figure 16:
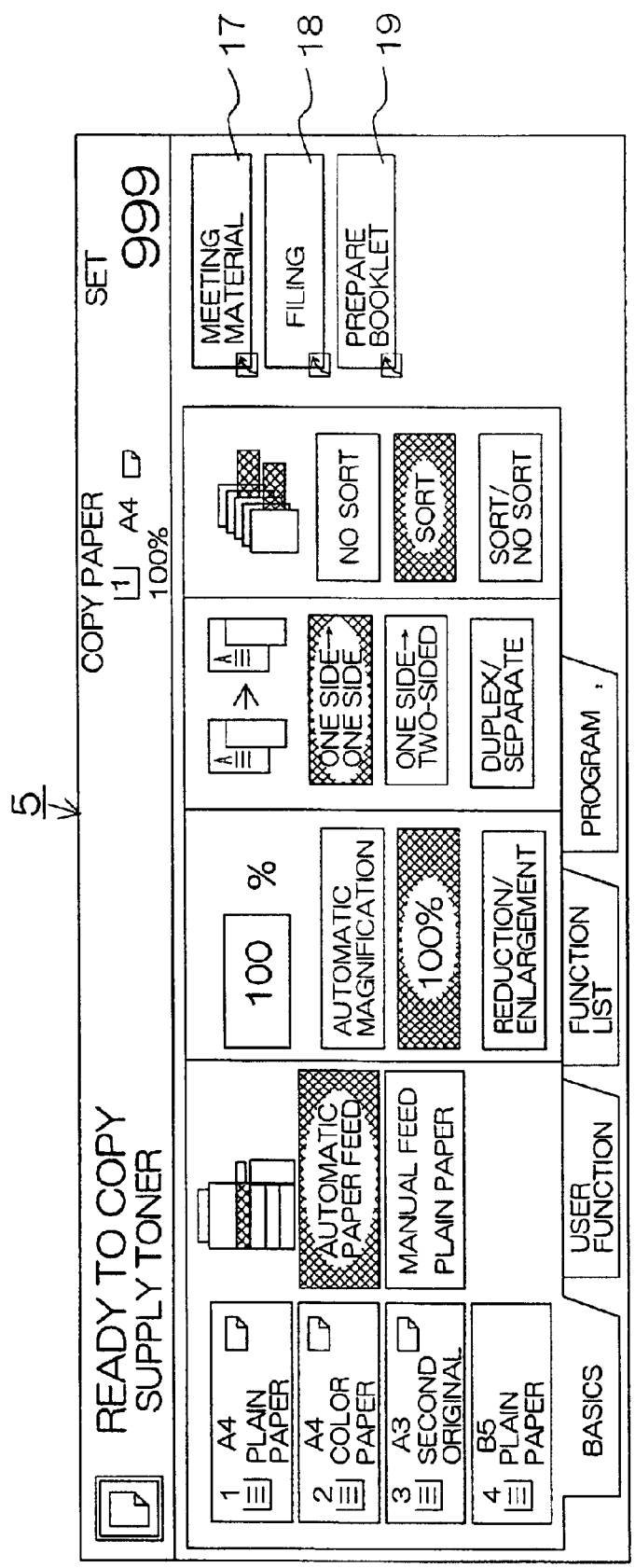
FIG. 16 shows the basic screen with shortcut keys having titles arbitrarily inputted from the keyboard on the character entry screen.

Or, when the operator presses the "Enter free title from the keyboard" key 56 on the screen in FIG. 10, the screen switches to the character entry screen 63 shown in FIG. 15, where the operator can enter an arbitral title by using the keyboard 64 on the character entry screen 63 into the character display part 65 provided in the character entry screen 63. After the entry of the characters, when the operator presses the "Enter" key 66, the Combination function whose setting contents are "2 in 1", "Left side binding", and "Dashed line" has been allocated to the "Shortcut 2" key 18. At the same time, the free title "Filing" is displayed on the shortcut key 18 as shown in FIG. 16.

Because of the arrangement allowing the operator to enter arbitral characters from the keyboard 64 on the character entry screen 63, it is possible to display titles that meet the user's needs more suitably on the shortcut keys. Differentiation among the shortcut keys therefore becomes easier, further improving the operability.

Figure 17:
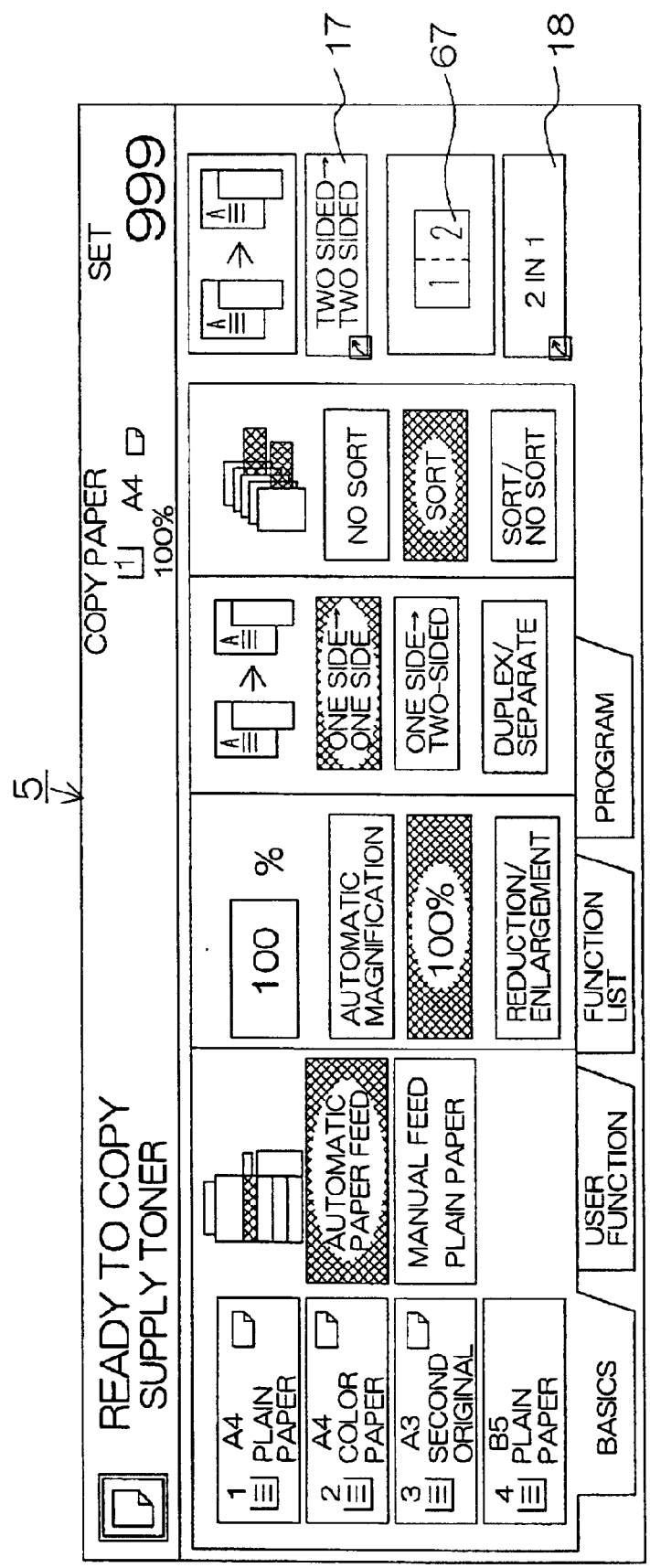
FIG. 17 illustrates the basic screen with shortcut keys having titles selected from the title list as well as icons selected from the icon list inputted therein.

Also, in this embodiment, it is possible to make the shortcut keys display both the icons and titles at the same time. When the operator presses the "Select icon from the icon list and title from the title list" key 57 on the screen in FIG. 10, the icon selection screen shown in FIG. 13 is displayed. The operator selects a desired icon from the icon list in the icon selection screen and then presses the "Close" key 61, the title selection screen shown in FIG. 11 is displayed. Then, the operator selects a desired title from the title list in this title selection screen and presses the "Close" key 60, when the Combination function whose contents are "2 in 1", "Left side binding", and "Dashed line" has been allocated to the "Shortcut 2" key 18. At the same time, the selected title "2 in 1", is displayed on the "Shortcut 2" key 18 with the selected icon 67 located above the title in a double-columned manner as shown in FIG. 17. Incidentally, when the shortcut keys are used so as to display both the icons and titles at the same time, it is desirable to allow only a part (for instance, two) of the shortcut keys to be set in such a manner taking the limited display area of the basic screen 5 (FIG. 2) into consideration.

Figure 18:
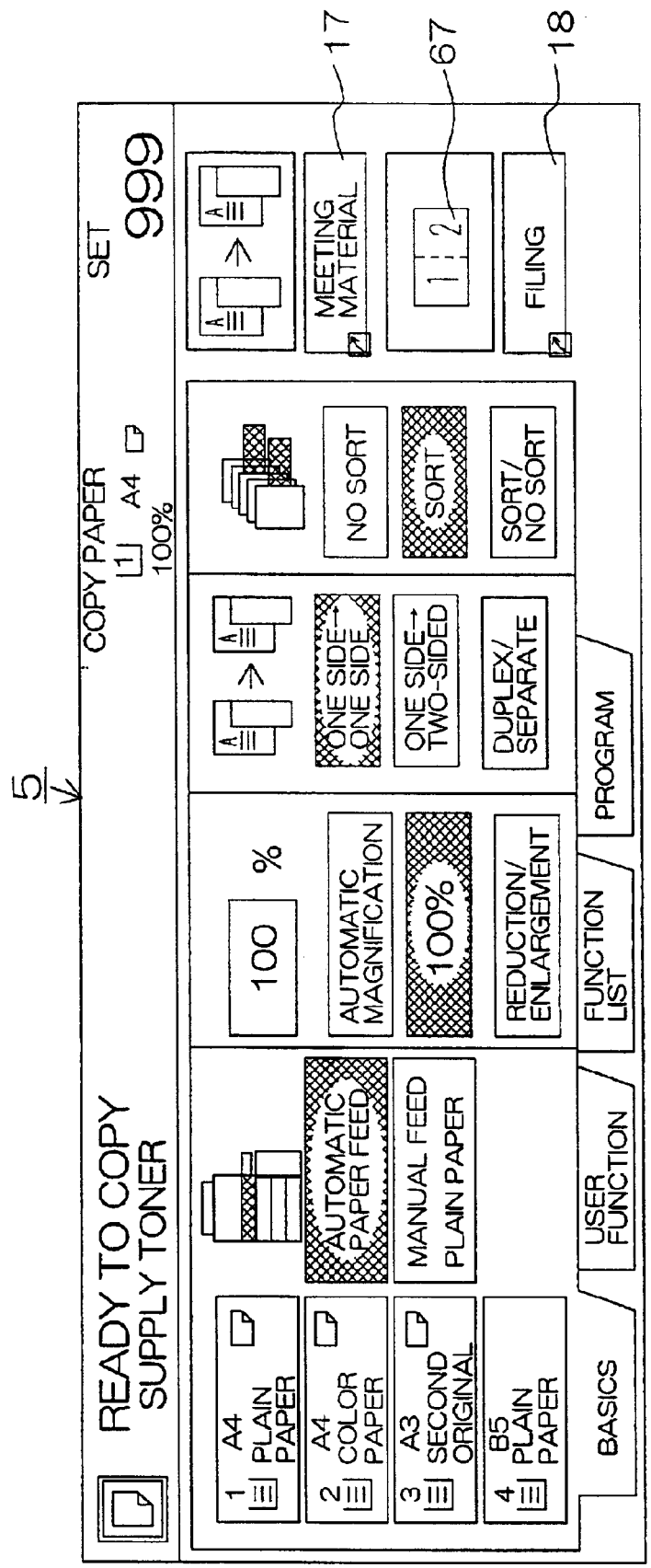
FIG. 18 illustrates the basic screen with shortcut keys having titles arbitrarily entered from the keyboard on the character entry screen as well as icons selected from the icon list.

Or, when the operator presses the "Select icon and enter free title from the keyboard" key 58 on the screen in FIG. 10, the icon selection screen shown in FIG. 13 is displayed. When the operator selects a desired icon from the icon list in the icon selection screen and then presses the "Close" key 61, the character entry screen 63 shown in FIG. 15 is displayed. Then, the operator enters a desired title by using the keyboard 64 on the character entry screen 63 into the character display part 65 provided in this character entry screen 63 and presses the "Enter" key 66, when the Combination function whose contents are "2 in 1", "Left side binding", and "Dashed line" has been allocated to the "Shortcut 2" key 18. At the same time, the selected title "Filing" is displayed on the "Shortcut 2" key 18 with the selected icon 67 located above the title in a double-columned manner as shown in FIG. 18. When the shortcut keys are used to display both the titles and icons through this procedure, it is also desirable to allow only a part (for instance, two) of the shortcut keys to be set in such a manner taking the limited display area of the basic screen 5 (FIG. 2) into consideration similarly to the above case.

Meanwhile, when a title and an icon included in the prepared titles and icons are selected to be displayed on the "Shortcut 2" key 18 in this embodiment, the arrangement may also be such that when the selected function (the Combination function containing the "2 in 1", "Left side binding" and "Dashed line" settings) has been allocated to the "Shortcut 2" key by pressing the "shortcut 2" key 52 on the above mentioned screen for key designation for registration (See FIG. 9), the title and icon which correspond to the selected function are automatically displayed on the "shortcut 2" key. This arrangement reduces the frequency of the operator's operations and facilitates setting of the shortcut keys for registration.

<Block Diagram of the Control System in Copier>

Figure 19:
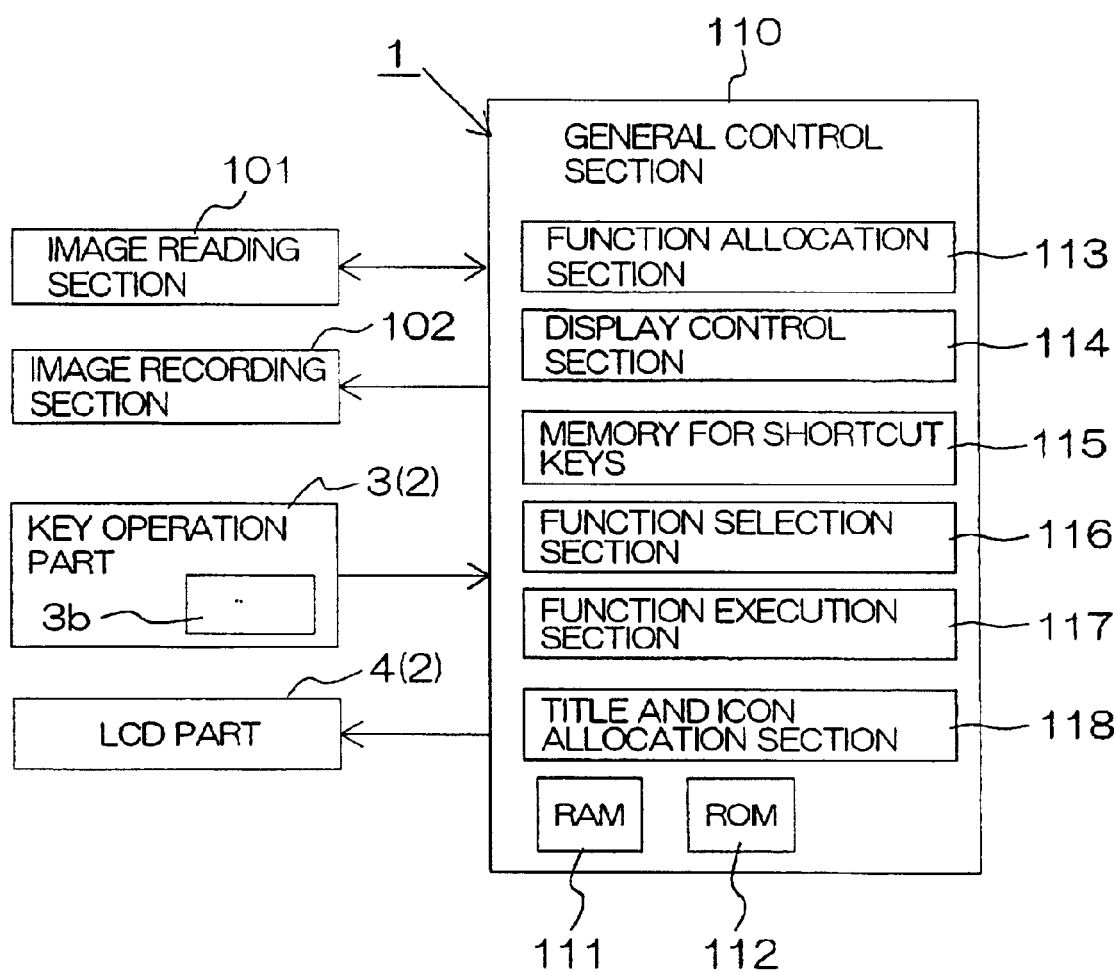
FIG. 19 is a block diagram illustrating an example of the control system of a copier.

FIG. 19 is a block diagram showing an example of the control system of the copier 1.

As shown in FIG. 19, the copier 1 includes an image reading section 101, an image recording section 102, an operation section 2 and a general control section 110, in which the operation section 2 consists of a key operation part 3 and a LCD part 4.

The image reading section 101 is a section for reading originals to be copied. The image reading section comprises an automatic original feeder part for automatically feeding originals, an imaging part comprising a CCD line image sensor and an image processing part, in which the original is automatically fed so that the imaging part relatively scans the original surface and imports the image of the original by converting it into image signals line by line, and the image signals are processed by prescribed signal processings (level compensation, γ compensation, A/D conversion, etc.) and sequentially outputted to the general control section 110.

The image recording section 102 records the image data that have been scanned by the image reading section 101 on recording paper. The image recording section 102 comprises, for example, a laser printer, which irradiates laser beams that are ON/OFF-controlled based on the data scanned by the image reading section 101 toward a photoreceptor so as to create a static latent image on the surface of the photoreceptor. After the latent image has been made visible by deposition of toner on the surface of the photoreceptor, the visible toner image is transferred onto the paper, thereby forming an image on the paper.

The key operation part 3 in the operation section 2 is the part for carrying out various entering operations (setting of various modes and conditions) according to which the copier 1 performs processing of image data for copying.

The LCD part 4 in the operation section 2 includes the touch panel, liquid crystal display and the like as mentioned above, and displays various screens including the basic screen 5 and the user function screen 11.

The general control section 110 comprises a microcomputer, which controls the operations of the above mentioned sections so as to regulate the copying functions of the copier. This general control section 110 includes ROM112 in which programs of various functions required for the copier 1 are saved, and RAM111 for performing predetermined data processings according to the above mentioned programs.

In addition to ROM112 and RAM111, the general control section 110 includes a function allocation section 113, a display control section 114, a memory for shortcut keys 115, a function selection section 116, a function execution section 117, and a title and icon allocation section 118.

The function allocation section 113 receives pressure signals and the like from the shortcut registration key and shortcut key selection keys and allocates the functions and their setting details inputted by the above mentioned various function keys to the shortcut keys.

The display control section 114 makes the LCD part 4 in the operation section 2 display various screens in response to the pressing operations of the above various function keys by the operator.

The memory for shortcut keys 115 stores relations between the shortcut keys and the respective functions allocated thereto.

The function selection section 116 reads out the functions corresponding to the shortcut keys that have been operated by pressing from data stored in the memory for shortcut keys 115.

The function execution section 117 executes copying according to the functions and the like that have been read out by the above function selection section 116.

The title and icon allocation section 118 allocates the titles and icons that have been selected on the title entry screen and the icon selection screen, respectively, to the shortcut keys. Also it allocates the titles that have been entered from the keyboard on the character entry screen to the corresponding shortcut keys.

<Effects of this Embodiment>

It will be clearly understood from the above description that the copier 1 according to this embodiment provides in its basic screen 5 the keys 13a–13f and 14–16 for selecting a plurality of predetermined functions (for example, the functions in FIG. 2 such as "Paper selection", "Reduction/Enlargement", "Duplex/Separate" and "Sort/No sort"), as well as a plurality of shortcut keys 17–19. It is possible in this embodiment to allocate functions other than the above predetermined ones and their specific setting details to the shortcut keys 17–19. Also, this embodiment is arranged such that the titles and icons corresponding to the functions allocated to the shortcut keys 17–19 can be displayed on the shortcut keys 17–19.

Accordingly, in this embodiment, when executing the functions allocated to the shortcut keys 17–19, the operator can select the desired functions according to the indications on the shortcut keys 17–19, and get the desired copying started only by pressing the shortcut keys 17–19, while being spared operations for setting details of the selected functions. The copier 1 according to this embodiment therefore allows the operator to carry out operations on the operation section 2 very easily, thus improving the operability thereof.

In addition, since the copier 1 of this embodiment makes it possible to enter arbitrarily selected characters by using the keyboard 64 on the character entry screen 63 so as to be displayed on the shortcut keys 17–19, titles are displayed on the shortcut keys 17–19 more exactly reflecting the user's needs, and differentiation among the shortcut keys 17–19 is further facilitated so that the operability is further improved.

Furthermore, since the copier 1 of this embodiment is arranged such that desired functions can be allocated directly to the respective shortcut keys 17–19 by operations on the detailed setting screens for the corresponding functions, allocation tasks are made easier than in cases where such tasks are carried out separately on specific screens by sequentially pressing a plural number of keys.

The present invention is not limited to the copier according to the above embodiment, but widely applicable to image forming devices including facsimiles, printers, and multifunction devices combining these devices.

2. Second Embodiment

Figure 20:
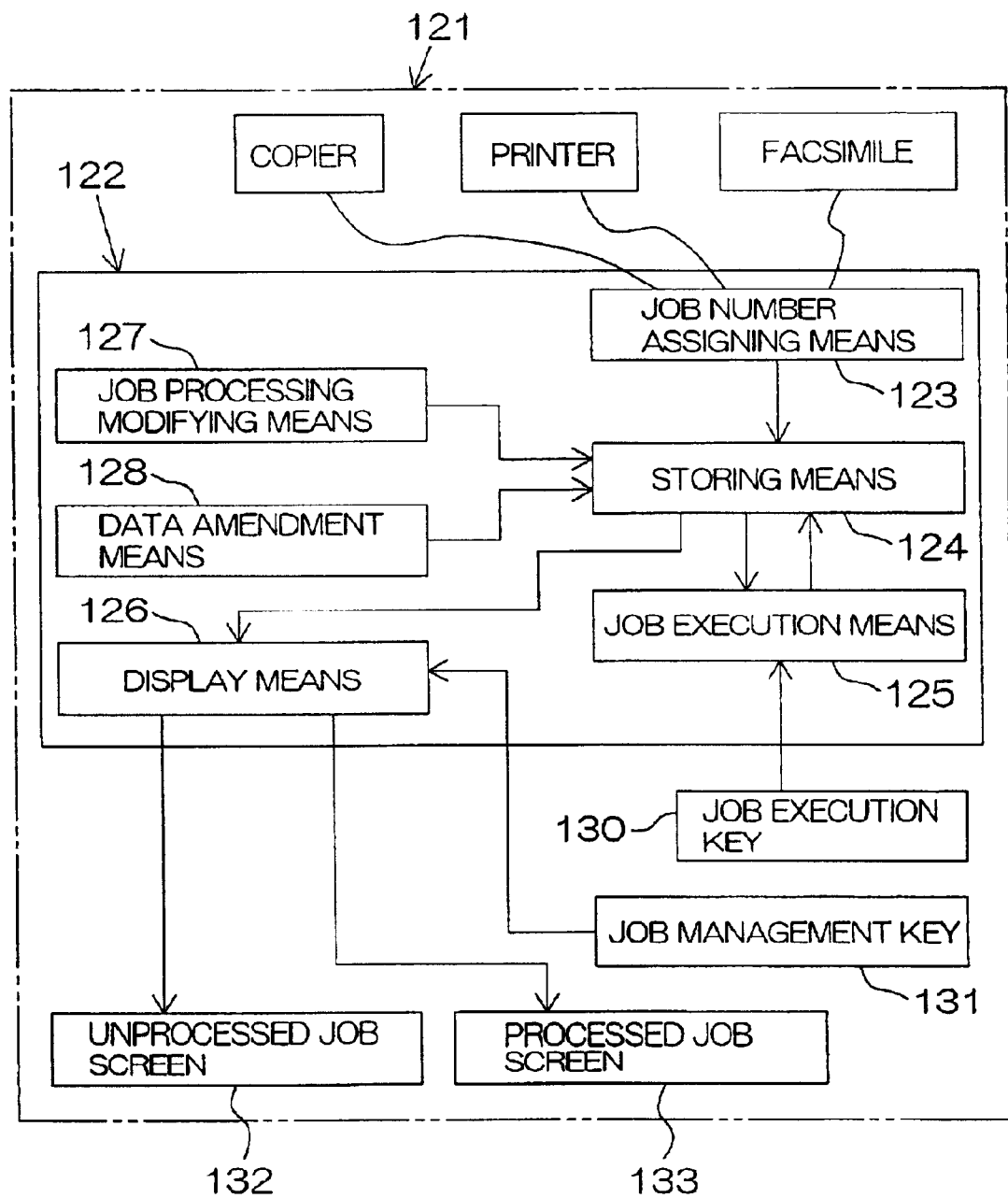
FIG. 20 is a block diagram illustrating the control system of the job management device of a multifunction digital device.

FIG. 20 is a block diagram showing the control system of a job management device 122 used for the image forming device (hereinafter referred to as the "digital multifunction device") 121 according to an embodiment of the present invention.

As shown in FIG. 20, the digital multifunction device 121 has the functions of a copier, a printer and a facsimile. The job management device 122 thereof comprises job number assigning means 123, storing means 124, job execution means 125, display means 126, job processing modifying means 127, and data amendment means 128.

Figure 22:
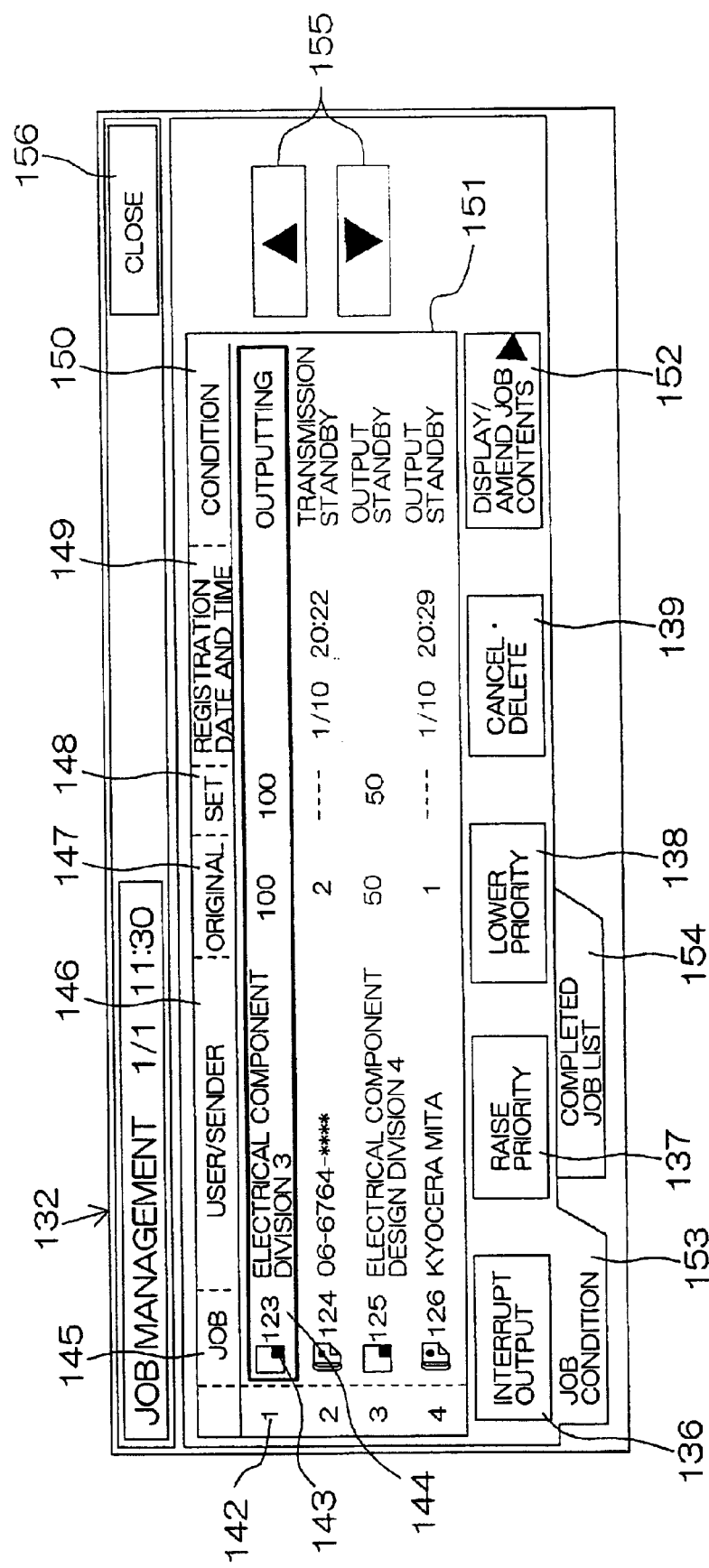
FIG. 22 illustrates a screen indicating unprocessed jobs on the display section of the multifunction digital device.
Figure 23:
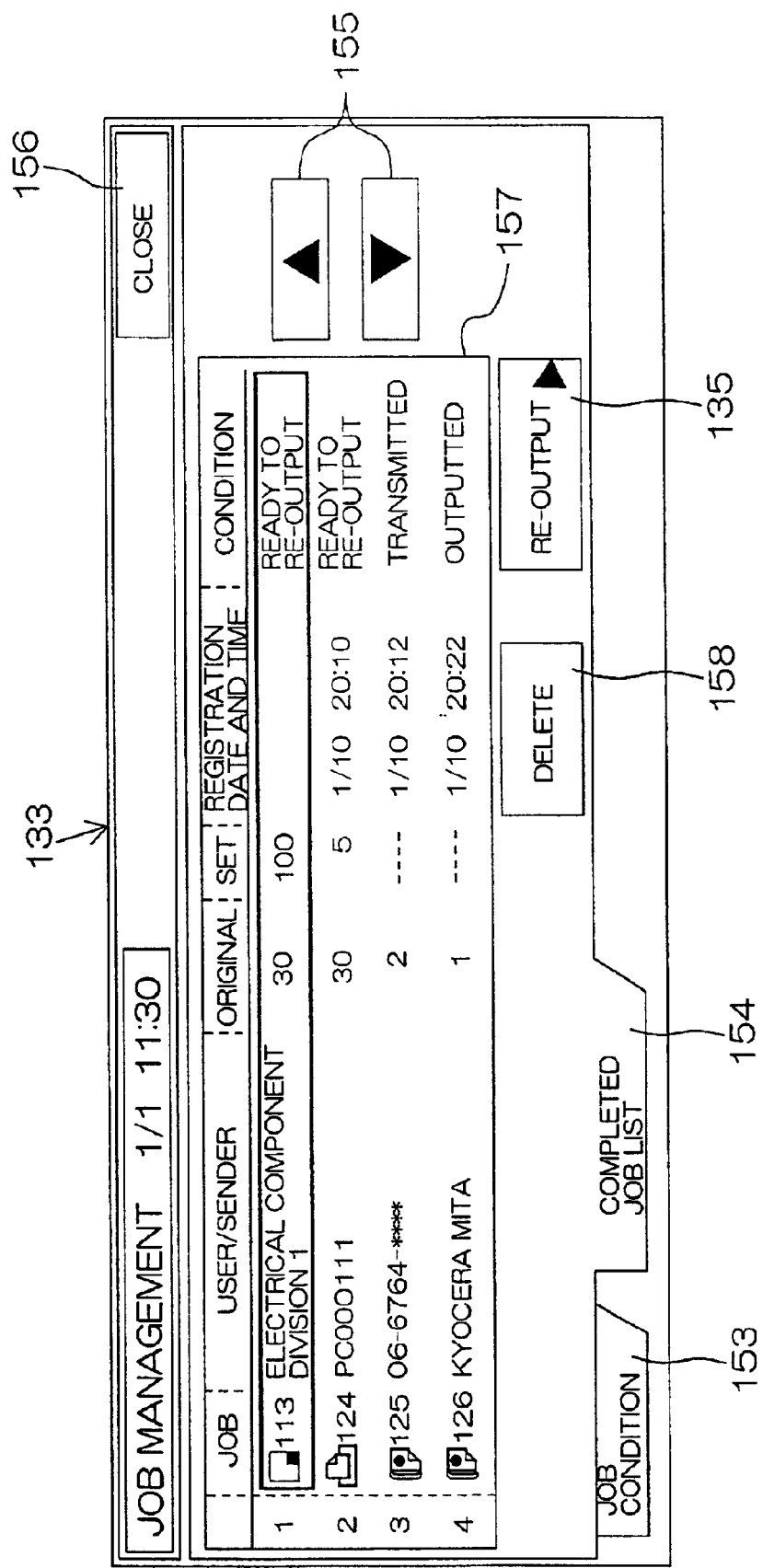
FIG. 23 illustrates a screen indicating processed jobs on the display section of the multifunction digital device.

The job number assigning means 123 provides job data obtained by utilizing the functions of the copier, printer, and facsimile with job numbers. Here, analog data are converted into digital data via an A/D conversion device or the like and inputted into the job management device 122 thereafter so that the digital signals are processed by the job management device 122. The job numbers given to the job data by this job number assigning means 123 are serial numbers in chronological sequence. User/Sender data and job processing data representing the processing conditions of the jobs are also provided by the job number assigning means 123. The job processing data include, as shown in FIGS. 22 and 23, indications of the number of originals, the number of sheets of paper, registration date and time, and icons representing the kinds of functions (copier, printer, facsimile). This arrangement enables the user to seize the job processing conditions with more precision.

The storing means 124 comprises a hard disc capable of inputting and outputting great quantity of data, and stores job data provided with the job numbers by the job number assigning means 123 above by associating the job data with the respective job numbers.

The job execution means 125 executes jobs in the order of the assigned series numbers of the jobs in response to signals from the job execution key 130, as well as associates the job processing conditions with the job data stored in the storing means 124.

The display means 126 displays the job number list aligned in the order of the series numbers of the jobs on the job management screen in response to signals from the job management key 131. The job management screen consists of the unprocessed job screen 132 for displaying unprocessed jobs in FIG. 22 and the processed job screen 133 for displaying processed jobs in FIG. 23. These unprocessed job screen 132 and processed job screen 133 are displayed on the display part comprising the liquid crystal panel and the like in the digital multifunction device 121 together with the basic screen 134 shown in FIG. 21 in a hierarchical manner. In addition, this display means 126 indicates on the processed job screen 133 that certain jobs in the jobs displayed on the processed job screen 133 can be re-outputted, referring to the jobs that are to be printed out in the printer section of the digital multifunction device 121, while displaying a re-output key 135 for directing an instruction to re-output on the processed job screen 133. Moreover, this display means 126 displays data of the job being processed (which means the serial number and the letters of the "job" in this embodiment) on the basic screen 134 in FIG. 21.

The job processing modifying means 127 modifies the order of job processing and executes jobs according to the modified job processing order. Incidentally, the "Interrupt output" key 136, "Raise priority" key 137, "Lower priority" key 138 and "Cancel-Delete" key 139 in FIG. 22 are included in this job processing modifying means.

The data amendment means 128 amends the data of unprocessed jobs on a keyboard screen (not shown) displayed being overlapped with the unprocessed job screen 132.

Now, each of the basic screen 134 (FIG. 21), unprocessed job screen 132 (FIG. 22), and processed job screen 133 (FIG. 23) displayed on the display section of the digital multifunction device 121 is described.

Figure 21:
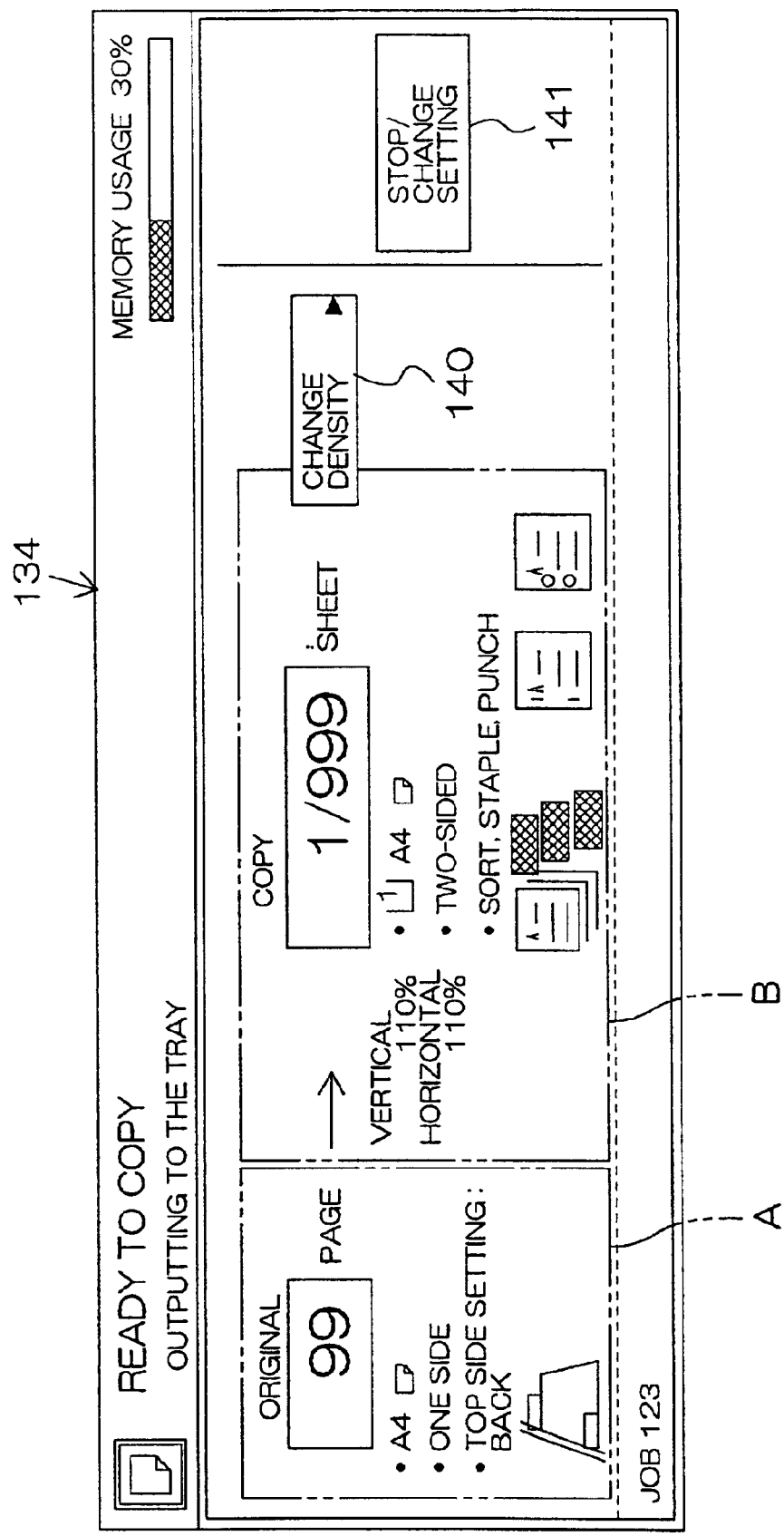
FIG. 21 illustrates a basic screen displayed on the display section of the multifunction digital device.

The basic screen 134 shown in FIG. 21 is the screen displayed when the unprocessed job screen 132 in FIG. 22 or the processed job screen 133 in FIG. 23 is closed, and is located at the top of the hierarchically arranged screens. On this basic screen 134, original information A and copy information B are displayed correlatively, and the data of the job being processed (the letters and serial number of the "job") are also displayed as mentioned above. In addition, a "Change density" key 140 for changing the density of copying and a "Stop/Change setting" key 141 to stop the copying and change the settings of the copy functions are displayed.

On the unprocessed job screen 132 in FIG. 22, priority numbers 142 are displayed on the leftmost area, followed by icons 143 each of which represents the feature of copier, printer, or facsimile, and a "job" column 145 indicating the serial numbers 144 of the jobs. To the right of the job column 145, there are displayed a "User/Sender" column 146, an "Original" column 147 indicating the numbers of originals, a "Set" column 148 indicating the numbers of set sheets, a "Registration date and time" column 149 indicating the dates and times of registration, and a "Condition" column 150 indicating the processing conditions (outputting, output standby, transmitting, transmission standby) in this order.

In addition, below the unprocessed job list 151, there are provided an "Interrupt output" key 136 for inserting a specific job to be outputted, a "Raise priority" key 137 for raising the priority level of a specific job, a "Lower priority" key 138 for lowering the priority level of a specific job, and a "Cancel/Delete" key 139 for canceling or deleting a job. These keys from the "Interrupt output" key 16 to "Cancel/Delete" key 139 constitute the job processing modifying means 127 as mentioned above. Next follows a "Display/Amend job contents" key 152 for displaying the contents of the designated job and amending the job contents by a keyboard (not shown) that is displayed with the unprocessed job screen 132 in an overlapped manner.

Below the keys including the "Interrupt output" key 136, a "Job condition" tab 153 and a "Completed job list" tab 154 are provided. When the "Completed job list" tab 154 is pressed, the screen switches to the processed job screen 133 in FIG. 23.

On the right side of the unprocessed job list 151, select buttons 155 for moving the highlighted part so as to select a job is disposed. Meanwhile, when the "Close" button 156 is pressed, the display turns from the unprocessed job screen 132 in FIG. 22 to the basic screen 134 in FIG. 21.

In the processed job screen 133 in FIG. 23, the contents of the columns displayed in the processed job list 157 are the same as those in FIG. 22, except for the "Condition" column where "Ready to re-output", "Transmitted", "Outputted" are displayed. Below this processed job list 157, a "Delete" key 158 for deleting the job data, and a "Re-output" key 135 for directing instruction to re-output the job data indicated as "Ready to re-output" are disposed.

In addition, the "Job condition" tab 153 and the "Completed job list" tab 154 are disposed in the area below the "Delete" key 158 and the "Re-output" key 135. When the "Job condition" tab 153 is pressed, the processed job screen 133 in FIG. 23 is shifted to the unprocessed job screen 132 in FIG. 22.

The select buttons 155 for moving the highlighted part so as to select a job are disposed on the right side of the processed job list 157. Pressing the "Close" button 156 brings the basic screen 134 in FIG. 21.

Incidentally, unlike the arrangement of this do not include the clocking function and therefore the job numbers assigned to the job data obtained through the copier functions do not include registration date and time information, it is still possible to adequately grasp the job processing conditions by referring to other data displayed on the unprocessed job screen 132 and the processed job screen 133 of this embodiment. However, the job processing conditions will be more precisely understood when all the job numbers include the respective registration date and time information.

Although the embodiment described above has been explained referring to a job management device used for a digital multifunction device, the present invention is not limited to this specific embodiment, but may be adopted as the job management device for image reading devices constituting part of digital multifunction devices, as well as for image reading devices which are the scanners utilized separately from the printer sections. That is, it may be arranged such that image data read by an image reading device in the form of digital signals are used as the job data so that the job management device described above manages the job data.

What is claimed is:

1. An image forming device comprising an operation section which comprises function selecting keys and at least one shortcut key disposed therein, wherein:
    a function can be allocated to the shortcut key according to an operation of the function selecting keys for selecting the function;
    the shortcut key is capable of displaying identification information, that can be selected from a group of icons that has been previously provided, corresponding to the function allocated thereto; and
    the function that has been allocated to the shortcut key can be executed by an operation of the shortcut key.

2. The image forming device according to claim 1, wherein the identification information comprises two kinds one of which is selectable from a group of regular titles that has been previously provided and the other is selectable from the group of icons that has been previously provided, and the two kinds of identification information are displayed on the shortcut key at the same time.

3. The image forming device according to claim 1, wherein the identification information comprises two kinds one of which can be inputted from a character entry screen and the other is selectable from the group of icons that has been previously provided, and the two kinds of identification information are displayed on the shortcut key at the same time.

4. An image forming device comprising an operation section which comprises function selecting keys and at least one shortcut key disposed therein, wherein:
    a function and a detailed setting thereof can be allocated to the shortcut key according to an operation of the function selecting keys for selecting the function;
    the shortcut key is capable of displaying identification information corresponding to the function allocated thereto;
    the function and the detailed setting thereof that have been allocated to the shortcut key can be executed by an operation of the shortcut key, and wherein
        the identification information comprises two kinds one of which is selectable from a group of regular titles that has been previously provided and the other is selectable from a group of icons that has been previously provided, and the two kinds of identification information are displayed on the shortcut key at the same time.

5. An image forming device comprising an operation section which comprises function selecting keys and at least one shortcut key disposed therein, wherein:
    a function and a detailed setting thereof can be allocated to the shortcut key according to an operation of the function selecting keys for selecting the function;
    the shortcut key is capable of displaying identification information corresponding to the function allocated thereto; and
    the function and the detailed setting thereof that have been allocated to the shortcut key can be executed by an operation of the shortcut key, and wherein
        the identification information comprises two kinds one of which can be inputted from a character entry screen and the other is selectable from a group of icons that has been previously provided, and the two kinds of identification information are displayed on the shortcut key at the same time.

* * * * *